(12) United States Patent
Saigo et al.

(10) Patent No.: US 8,015,207 B2
(45) Date of Patent: Sep. 6, 2011

(54) METHOD AND APPARATUS FOR UNSTRUCTURED DATA MINING AND DISTRIBUTED PROCESSING

(75) Inventors: Kiyokazu Saigo, San Jose, CA (US); Hidehisa Shitomi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 332 days.

(21) Appl. No.: 12/393,721

(22) Filed: Feb. 26, 2009

(65) Prior Publication Data

US 2010/0228723 A1    Sep. 9, 2010

(51) Int. Cl.
*G06F 17/00*  (2006.01)
(52) U.S. Cl. ......... 707/791; 707/609; 707/802; 707/821
(58) Field of Classification Search ........... 707/600–831
See application file for complete search history.

(56) References Cited

U.S. PATENT DOCUMENTS 7,127,416 B1 * 10/2006 Tenorio ................. 705/26.62

OTHER PUBLICATIONS

Google Search Appliance, http://www.google.com/enterprise/gsa/features.html, retrieved on Feb. 26, 2009.

\* cited by examiner

*Primary Examiner* — Isaac M Woo
(74) *Attorney, Agent, or Firm* — Sughrue Mion, PLLC

(57) ABSTRACT

A sort server including a central processing unit, a memory and a network interface configured to interconnect the sort server with a search server, at least one storage system and multiple processing servers using at least one network. The sort server is configured to receive a search result from the search server and to assign multiple tasks to the processing servers. The assignment of the multiple tasks is based on a condition including the search result. Assignment of the tasks to servers may be based on CPU load of at least some of the multiple servers, network architecture, network distance between the servers and the storage system storing the required object, failure information, urgency of the task, Level Agreement associated with the servers and other tasks performed by the servers.

20 Claims, 28 Drawing Sheets

Step1) Search Server
Search Files

Fig.6

Step1) Search Server
Index Table ~03002

| | | |
|---|---|---|
| 06001 | ID | 00000123 |
| 06002 | Name | \\[Storage Address]\home\user01\test01.txt |
| 06003 | Owner | User01 |
| 06004 | Size | 1KB |
| 06005 | Type | Document |
| 06006 | Date | Oct 29 2008 12:00 PM |
| 06007 | Access Control | None |
| 06008 | Attribute | Product X01 Customer Opinion |
| 06009 | Storage Address | 192.168.1.100 (NAS System-1 Storage System) |
| | ID | 00000124 |
| | Name | \\[Storage Address]\home\user01\test02.txt |
| | Owner | User01 |
| | Size | 1KB |
| | (Omit) | |

Step2) Sort Server
Sort Tasks

Step2) Sort Server Sort Tasks

Fig.13

Step2) Sort Servers

Topology Table ~03103

| | NAS System-1 | NAS System-2 | NAS System-3 | ....... |
|---|---|---|---|---|
| General Server-1 | OK | OK | OK | |
| General Server-2 | OK | OK | OK | |
| General Server-3 | OK | OK | OK | |
| General Server-4 | OK | OK | OK | |
| | | (Omit) | | |

13001-1, 13001-2, 13001-3

13101-1, 13101-2, 13101-3, 13101-4

Fig.14
Step2) Sort Servers
Connection Table ~03104

|  | NAS System-1 | NAS System-2 | NAS System-3 | ....... |
|---|---|---|---|---|
| General Server-1 | <1ms | 10ms | <1ms |  |
| General Server-2 | 10ms | <1ms | <1ms |  |
| General Server-3 | <1ms | <1ms | <1ms |  |
| General Server-4 | <1ms | <1ms | <1ms |  |

(Omit)

Fig.15
Step2) Sort Servers
G-Server Status Table ~03105

| | Name | Address | Site | CPU |
|---|---|---|---|---|
| 15101-1 | General Server-1 | 192.168.100.200 | Site-1 | 1% |
| 15101-2 | General Server-2 | 192.168.100.201 | Site-1 | 2% |
| 15101-3 | General Server-3 | 192.168.100.202 | Site-2 | 50% |
| 15101-4 | General Server-4 | 192.168.100.203 | Site-2 | 50% |

Column headers: 15001, 15002, 15003, 15004

(Omit)

Fig.16
Step2) Sort Servers: Handling List

| | 16001 | 16002 | 07001 | 07002 | 07003 | 07004 |

| Task ID | General Server | Storage Address | Num | ID | Name |
|---|---|---|---|---|---|
| t0000001 | 192.168.100.200 (General Server-1) | 192.168.1.100 (NAS System-1 Storage System) | 10000 Objects | 00000123 | \\[Storage Address]\home\user01\test01.txt |
| | | | | 00000124 | \\[Storage Address]\home\user01\test02.txt |
| | | | | 00000125 | \\[Storage Address]\home\user01\test03.txt |
| | | | | 00000126 | \\[Storage Address]\home\user01\test04.txt |
| | | | | 00000127 | \\[Storage Address]\home\user01\test05.txt |
| | | | | ......... | ......... |
| t0000002 | 192.168.100.201 (General Server-2) | 192.168.1.101 (NAS System-2 Storage System) | 10000 Objects | 00000128 | \\[Storage Address]\home\user01\test06.txt |
| | | | | 00000129 | \\[Storage Address]\home\user01\test07.txt |
| | | | | ......... | ......... |

Summary Example

Fig.18

Step2) Sort Servers:
Task Management Table ~03106

| Task ID | General Server | Storage Address | Num | Start Time | Finish Time | Result | ID |
|---|---|---|---|---|---|---|---|
| 16001 | 16002 | 07001 | 07002 | 18001 | 18002 | 18003 | 07003 |
| t0000001 | 192.168.1 00.200 (General Server-1) | 192.168.1 .100 (NAS System-1 Storage System) | 10000 Objects | Oct/30 2008 10:10:00 | Oct/30 2008 10:12:00 | \output\t0 000001 | |
| t0000002 | 192.168.1 00.201 (General Server-2) | 192.168.1 .101 (NAS System-2 Storage System) | 20000 Objects | Oct/30 2008 10:10:00 | --/-- | -- | |

Fig.22
Step1) Search Server
Corresponding List –ver2-

| Storage Address (07001) | Num (07002) | ID (07003) | Name (07004) |
|---|---|---|---|
| 192.168.1.100 (File Server-1) | 40000 Objects | 00000123 | \home\user01\test01.txt |
| | | 00000124 | \home\user01\test02.txt |
| | | 00000125 | \home\user01\test03.txt |
| | | 00000126 | \home\user01\test04.txt |
| | | 00000127 | \home\user01\test05.txt |
| | | ...(omit).... | ...(omit).... |
| 192.168.1.101 (File Server-2) | 40000 Objects | 00000123 | \home\user01\test01.txt |
| | | 00000124 | \home\user01\test02.txt |
| | | ...(omit).... | ...(omit).... |
| 192.168.1.102 (File Server-3) | 40000 Objects | 00000123 | \home\user01\test01.txt |
| | | ...(omit).... | ...(omit).... |

Fig.23

Step2) Sort Servers

F-Server Status Table ~03107

| Name 23001 | Address 23002 | Site 23003 | CPU 23004 |
|---|---|---|---|
| File Server-1 | 192.168.100.210 | Site-1 | 1% |
| File Server-2 | 192.168.100.211 | Site-1 | 2% |
| File Server-3 | 192.168.100.212 | Site-1 | 50% |
| | | (Omit) | |

Fig.24
Step2) Sort Servers:
Handling List –ver2–

| Task ID | General Server | Storage Address | Num | ID | Name |
|---|---|---|---|---|---|
| t0000001 | 192.168.100.200 (General Server-1) | 192.168.10.100 (File Server-1) | 10000 Objects | 00000123 | \home\user01\test01.txt |
| | | | | 00000124 | \home\user01\test02.txt |
| | | | | 00000125 | \home\user01\test03.txt |
| | | | | 00000126 | \home\user01\test04.txt |
| | | | | 00000127 | \home\user01\test05.txt |
| | | | | …(omit)…. | …(omit)…. |
| t0000002 | 192.168.100.201 (General Server-2) | 192.168.1.101 (File Server-2) | 10000 Objects | 00020123 | \home\user01\testXY.txt |
| | | | | 00020124 | \home\user01\testXZ.txt |
| | | | | …(omit)…. | …(omit)…. |

Column markers: 16001, 16002, 07001, 07002, 07003, 07004

Fig.27
Site Information Table ~03108

| | Site-1 | Site-2 | Site-3 | Site-4 | ....... |
|---|---|---|---|---|---|
| Site-1 27101-1 | | 30ms | 10ms | 100ms | |
| Site-2 27101-2 | 30ms | | 10ms | 10ms | |
| Site-3 27101-3 | 10ms | 10ms | | 20ms | |
| Site-4 27101-4 | 100ms | 10ms | 20ms | | |

Columns: 27001-1, 27001-2, 27001-3, 27001-4

(Omit)

METHOD AND APPARATUS FOR UNSTRUCTURED DATA MINING AND DISTRIBUTED PROCESSING

DESCRIPTION OF THE INVENTION

1. Field of the Invention

The invention relates generally to storage systems. Specifically, it relates to stored data mining and processing.

2. Description of the Related Art

Recently, many enterprises have come to possess very large quantities of various objects, files and other data that are related to their business activities. Such information may be distributed in many sites, and in many servers and storage devices. However, these stored information need to be treated and processed effectively. Several search appliances, such as "Google search appliance," well known in the art and available from Google Inc. of Mountain View, Calif., are used in the enterprise environment to perform search-related functions. Use of such appliances enables employees to simultaneously view several objects which may be stored in different locations and are necessary for performing a particular task.

However, the functionality provided by the search appliances is insufficient, when it is required to handle a large number of objects. For example, when a user intends to summarize tens of thousands of customer complaints related to a certain product(s), he would need to follow the following steps. 1) Search documents related to the product. 2) Pass those documents to a processing server. In this case, search appliance helps only with the aforesaid step 1). However, in addition to 1), the user needs to select some processing servers, and input specific tasks into them. However, some processing servers may be overloaded, and other servers may be left unused. Thus, it may take an unduly long time to accomplish the aforesaid search and processing task using the conventional technology.

Therefore, what is needed is a novel method and apparatus for unstructured data mining and distributed processing.

SUMMARY OF THE INVENTION

The inventive methodology is directed to methods and systems that substantially obviate one or more of the above and other problems associated with conventional techniques for data mining and distributed processing.

In accordance with one aspect of the inventive concept, there is provided a sort server including a central processing unit, a memory and a network interface configured to interconnect the sort server with a search server, at least one storage system and multiple processing servers using at least one network. The sort server is configured to receive a search result from the search server and to assign multiple tasks to the multiple processing servers. The assignment of the multiple tasks is based on a condition, which may include the search result.

In accordance with another aspect of the inventive concept, there is provided a method performed by a sort server including a central processing unit, a memory and a network interface configured to interconnect the sort server with a search server, at least one storage system and multiple processing servers using at least one network. The inventive method comprises receiving a search result from the search server; and assigning multiple tasks to the multiple processing servers, wherein the assignment of the multiple tasks is based on a condition, which may include the search result.

In accordance with another aspect of the inventive concept, there is provided a tangible computer readable medium embodying a set of computer-executable instructions implementing a method performed by a sort server including a central processing unit, a memory and a network interface configured to interconnect the sort server with a search server, at least one storage system and multiple processing servers using at least one network. The inventive method involves: receiving a search result from the search server; and assigning multiple tasks to the multiple processing servers, wherein the assignment of the multiple tasks is based on a condition, which includes the search result.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 6 illustrates the details of an exemplary embodiment of the Index Table 03002.

FIG. 13 illustrates an exemplary embodiment of a Topology Table 03103.

FIG. 14 illustrates an exemplary embodiment of the Connection Table 03104 of the Sort Server 03100.

FIG. 15 illustrates an exemplary embodiment of the General Server Status Table 03105 of the Sort Server 03100.

FIG. 16 illustrates an exemplary embodiment of the Handling List, which the Sort Server 03100 reads out.

FIG. 18 illustrates an exemplary embodiment of the Task Management Table 03106 of the Sort Server 03100.

FIG. 22 illustrates an exemplary embodiment of Corresponding List 07001 in the configuration illustrated in FIG. 20.

FIG. 23 illustrates the details of an exemplary embodiment of the File Server Status Table 03107 of the Sort Server 03100.

FIG. 24 illustrates an exemplary embodiment of the Handling List in the configuration illustrates in FIG. 20.

FIG. 27 illustrates the details of an exemplary embodiment of the Site Information Table 03108.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

a. First Embodiment

Figure 1:
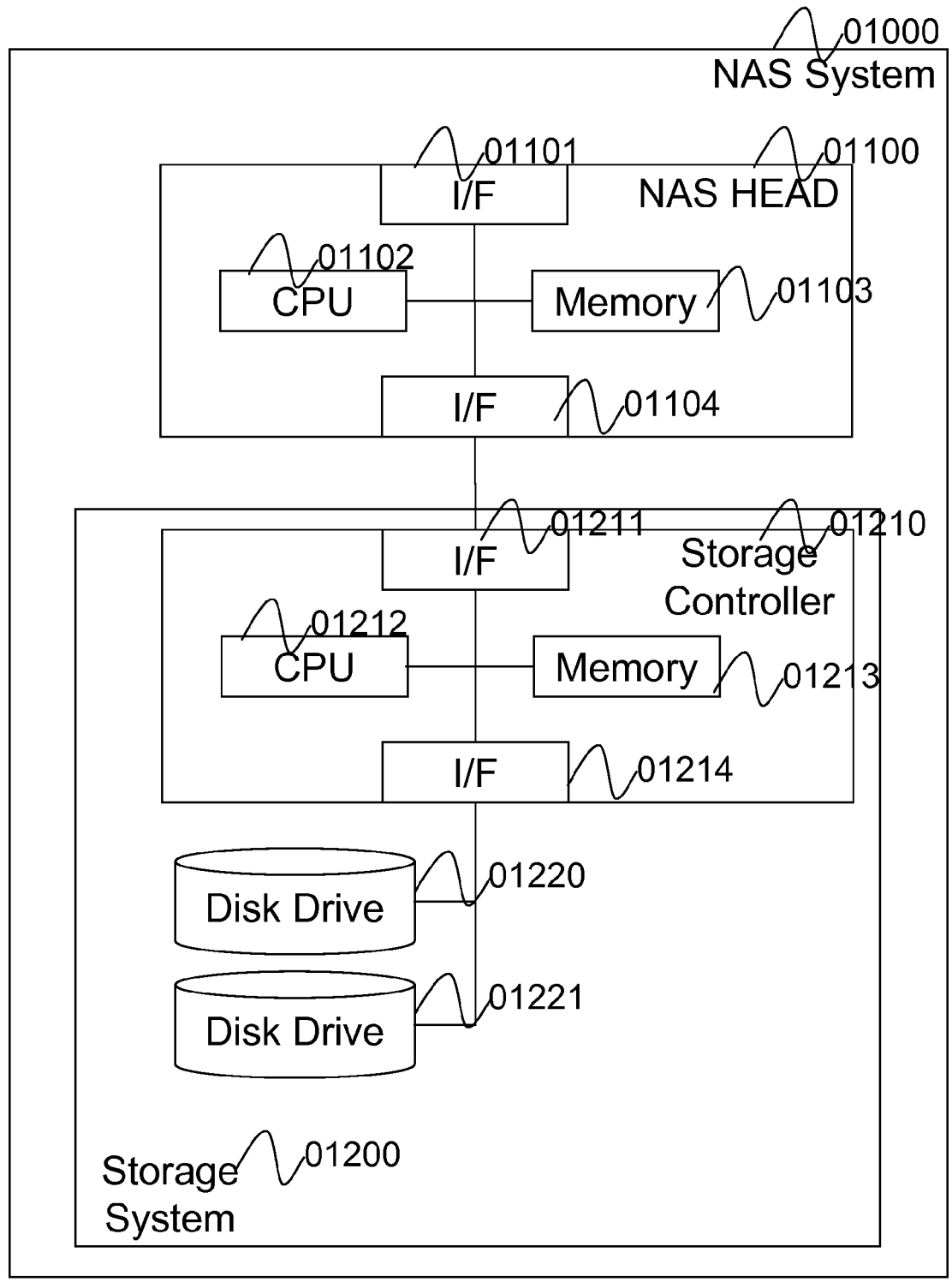
FIG. 1 illustrates an exemplary embodiment of a NAS system hardware configuration.

FIG. 1 illustrates an exemplary embodiment of a NAS system hardware configuration. The NAS System 01000 consists of at least one NAS HEAD 01100 and Storage System 01200.

NAS HEAD 01100 has at least one Interface 01101. With the Interface 01101, NAS HEAD 01100 (NAS System 01000) is connected to network. Through the Interface 01101, NAS System 01000 sends stored objects data, management data, and so on.

NAS HEAD 01100 has at least one CPU 01102 and Memory 01103. Files are loaded into Memory 01103, and CPU 01102 performs operations with the files.

NAS HEAD 01100 is connected to Storage System 01200 through Interface 01104.

Storage System 01200 has at least one Storage Controller 01200 and at least one Disk Drives 01220/01221.

Storage Controller 01210 has at least one Interface 01211. Storage Controller 01210 is connected to NAS HEAD 01100 through Interface 01211. One of the Interface 01211 can be connected to management network.

Storage Controller 01210 has at least one CPU 01212 and Memory 01213.

Storage Controller 01210 has at least one Interface 01214. Disk Drives 01220/01221 are connected to Interface 01214.

Figure 2:
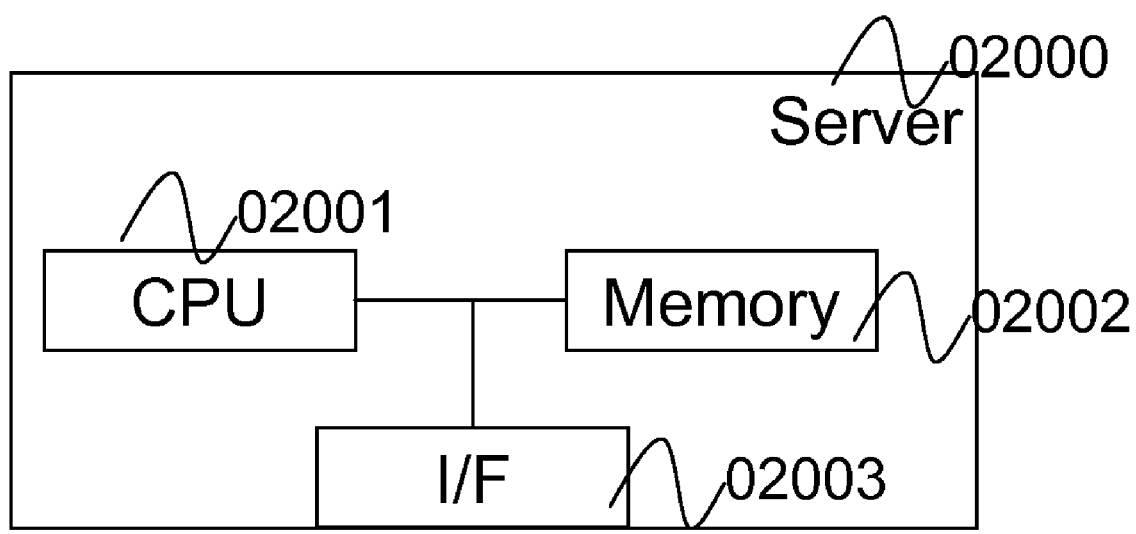
FIG. 2 illustrates an exemplary embodiment of a Server system hardware configuration.

FIG. 2 illustrates an exemplary embodiment of a Server system hardware configuration.

Server 02000 has at least one CPU 02001 and Memory 02002. Files/Programs are loaded into Memory 02002, and CPU 02001 works with them.

Server 02003 has at least one Interface 02003 with which Server 02003 is connected to network. One of the Interface 02003 can be connected to management network.

Figure 3:
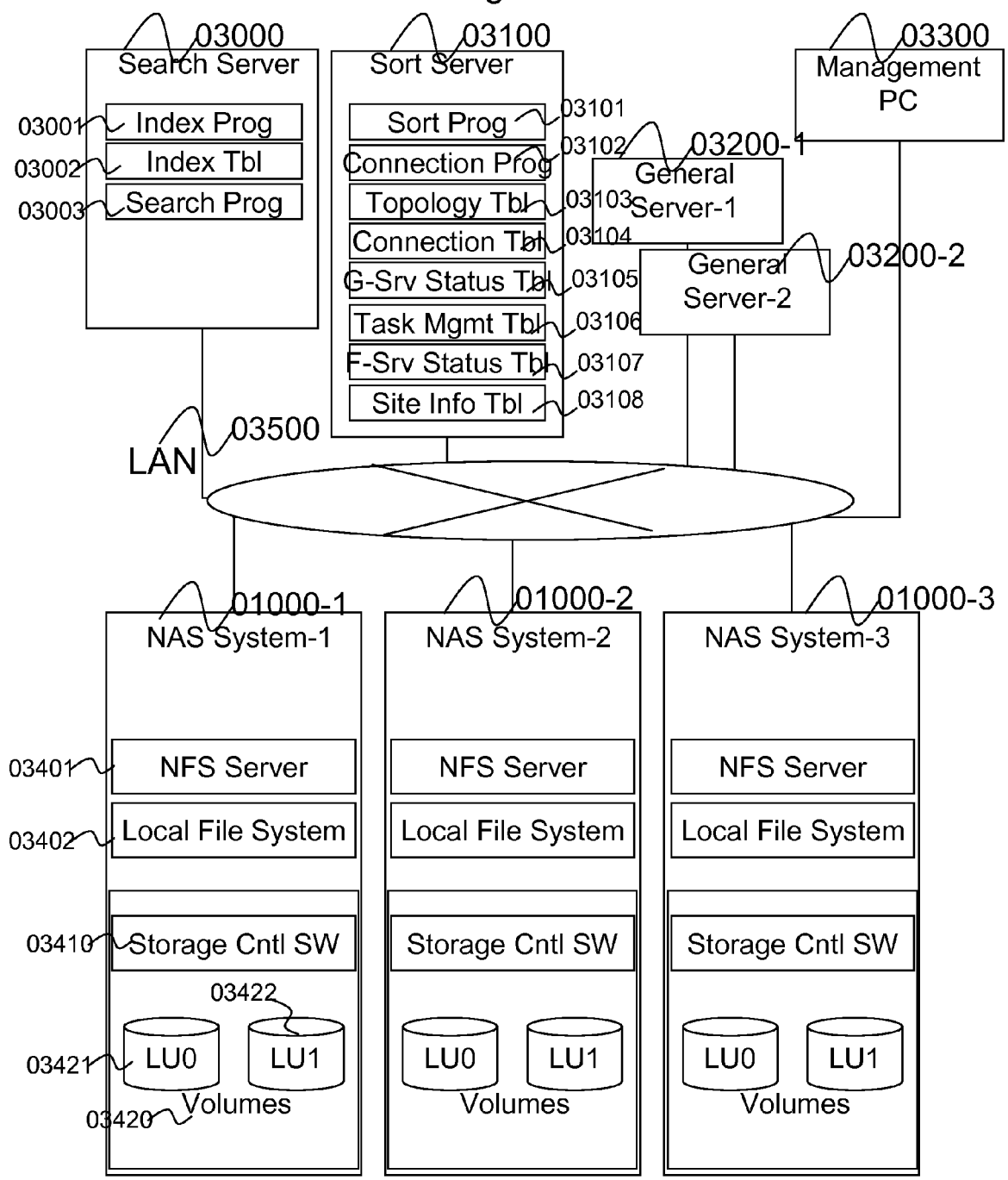
FIG. 3 illustrates an exemplary embodiment of a software configuration in which the method and apparatus of this invention applied.

FIG. 3 illustrates an exemplary embodiment of a software configuration in which the method and apparatus of this invention applied.

The system is composed of Search Server 03000, Sort Server 03100, General Server 03200-1/03200-2, Management PC 03300 and NAS System 01000-1/01000-2/01000-3. They are connected via network such as LAN 03500. The system is composed of at least one General Server 032000, and at least one NAS System 01000. The General Server component of the system will also be referred herein as a Processing Server.

Search Server 03000 figures out the objects/files/data stored in NAS Systems 01000-1/01000-2/01000-3. Search Server 03000 can search contents periodically, and renew the information. NAS Systems 01000-1/01000-2/01000-3 can inform to Search Server 03000 when some objects are stored or modified.

Index Program 03001 is the program which figures out the objects/files/data stored in NAS Systems 01000-1/01000-2/01000-3.

Index Table 03002 is renewed by Index Program 03001. The details of the Index Table 03002 are illustrated in FIG. 6.

Search Program 03003 searches Index Table 03002, and replies the result of retrieval. The result of retrieval is discussed in FIG. 7. Later, this is described as Corresponding List 07001.

Sort Server 03100 sorts tasks to General Servers 03200-1/03200-2, when many objects stored in NAS System 01000-1/01000-2/01000-3 are required to be handled. For simple example, to accomplish some task, 100,000 objects need to be processed. And there are 10 General Servers available. Sort Server 03100 orders each General Server 01000 handles 10,000 objects.

Sort Program 03101 is the program which sorts tasks to General Servers 01000. Several examples of Sort Program 03101 algorithm are described in FIG. 9-11. In the Sort Program 03101, Topology Table 03103, Connection Table 03104, General Server Status Table 03105, Task Management Table 03106, File Server Status Table 03107 and Site Information Table 03108 are used. The details of these tables are described in FIGS. 13, 14, 15, 18, 23 and 27.

General Servers 03200-1/03200-2 perform calculations. They share tasks, access NAS Systems 01000.

Management PC 03300 input tasks. A user use Management PC 03300.

NAS System 01000 stores objects/files/data. Each NAS System 01000 has NFS Server 03401 and Local File System 03402. General Server 03200 can access to NAS System 01000 via NFS, CIFS, and etc.

NAS System 01000 has Storage Control Software 03410 and Volumes 03420. Volumes 03420 have at least one LU. In this figure Volumes 03420 have LU0 03421 and LU1 03422.

Figure 4:
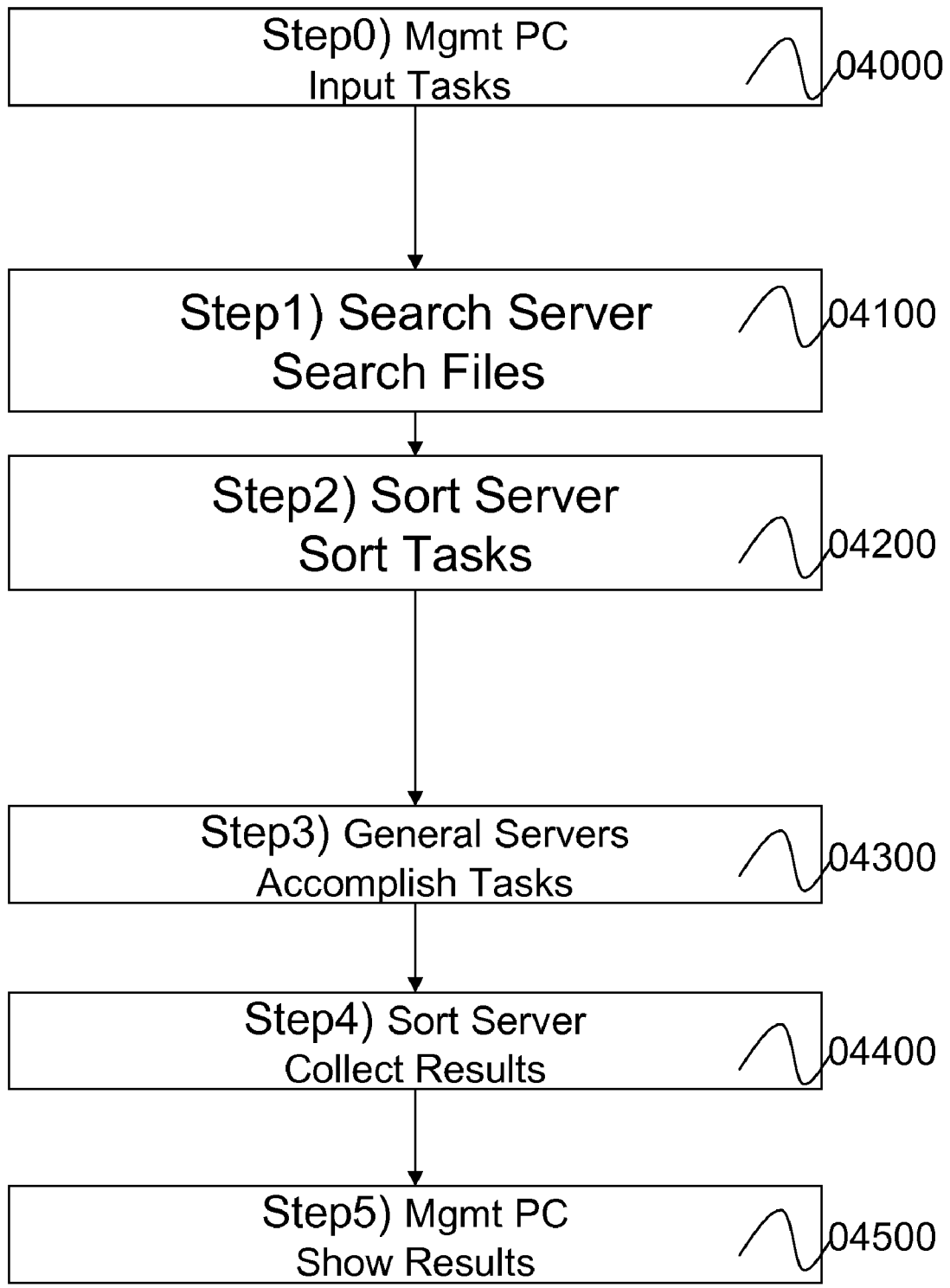
FIG. 4 illustrates an exemplary embodiment of a configuration of this invention.

FIG. 4 illustrates an exemplary embodiment of a configuration of this invention.

At step0 04000, a user inputs task using Management PC 03300.

At step1 04100, Search Server 03000 search objects/files/data required to accomplish the task input at 04000. Search Program 03003 searches Index Table 03002, and reads out Corresponding List 07001.

At step2 04200, Sort Server 03100 sorts tasks. To accomplish the tasks, General Servers 03200 download objects/files/data from NAS Systems 01000, and calculate as defined beforehand. Sort Server 03100 decides the sorting.

At step3 04300, according to the sorting, each General Server 03200 executes.

At step4 04400, Sort Server 03100 collects results. Each general server can send results to Sort Server 03100.

At step5 04500, Management PC 03300 shows results to the user.

Step1 04100 and Step2 04200 or one of the features of this invention. The conventional search server shows only result of retrieval, and does not give instructions. It likely happens that only 1 general server accesses to NAS Systems, downloads, and calculates. And it takes time to get output. The conventional distributed computing is not feasible in an environment in which stored contents are often modified or created.

Figure 5:
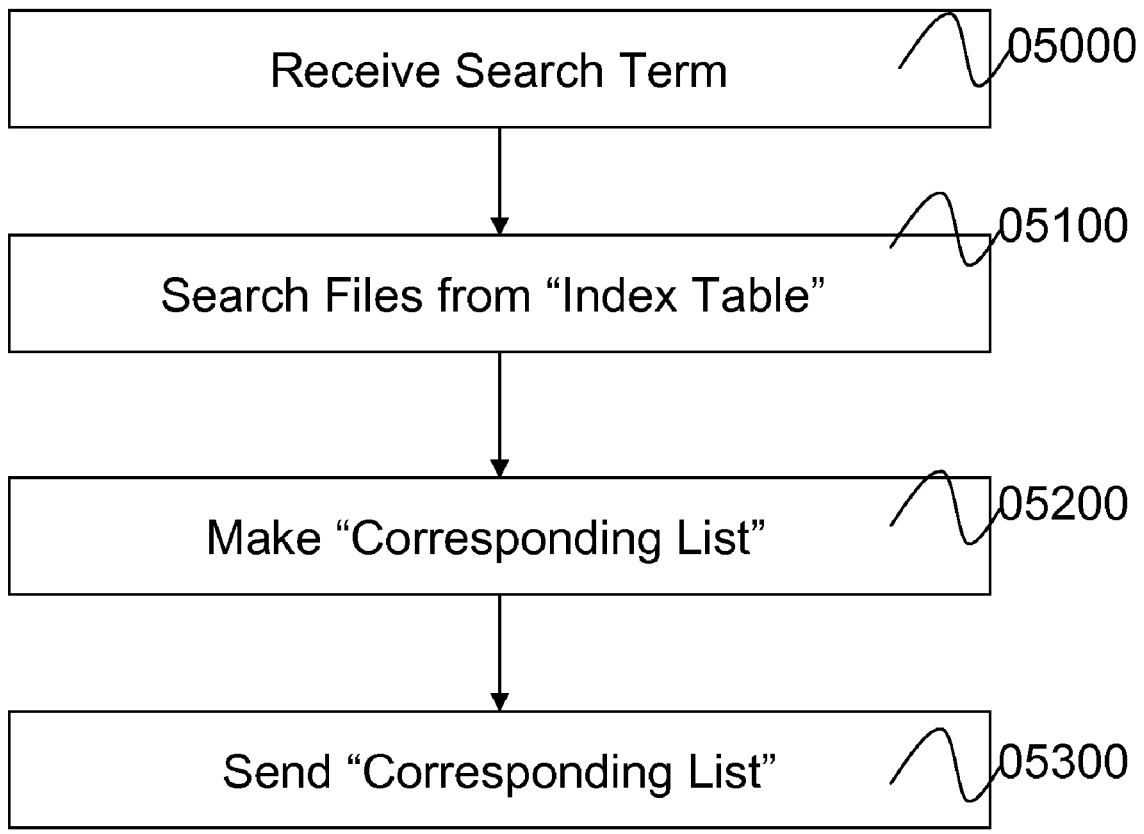
FIG. 5 illustrates the details of an exemplary embodiment of the step1 04100 of the process illustrated in FIG. 4.

FIG. 5 illustrates the details of step1 04100 of the process illustrated in FIG. 4.

At step05000, Search Server 03000 receives some search terms. For example, a user puts in tasks such as "Analyze Customer Opinions/internal Documents/External Reports/Designing Data, and Develop Causal Analysis/Commercial Research".

At step05100, Search Server 03000 searches corresponding objects/files/data from Index Table 03002. Explanation of the Index Table 03002 is provided with reference to FIG. 6.

At step 05200, Search Server 03000 reads out Corresponding List 07001. Explanation about Corresponding List 07001 is described with reference to FIG. 7.

At step 05300, Search Server 03000 sends Corresponding List 07001 to General Servers 03200.

FIG. 6 illustrates the details of Index Table 03002.

Index Table 03002 has the information about objects/files/data stored in NAS System 01000. Each objects/files/data has several components. In FIG. 6, some examples of the components are described.

ID 06001 is the unique number that distinguishes each objects/files/data.

Name 06002 is the name of the objects/files/data.

Owner 06003 is the owner name of the objects/files/data.

Size 06004 is the size of the objects/files/data.

Type 06005, Date 06006, Access Control 06007 can be defined.

Attribute 06008 is the attribute information of the objects/files/data.

Storage Address 06009 is the information of the NAS System in which the objects/files/data are stored.

Search Server 03000 searches objects/files/data that matches search terms, and reads out Corresponding List 07001.

Figure 7:
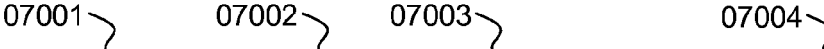
FIG. 7 illustrates an exemplary embodiment of the Corresponding List 07001 of Search Server 03000.

FIG. 7 shows Corresponding List 07001 of Search Server03000.

In Corresponding List 07001, there is some information about the corresponding objects/files/data.

Storage Address 07001 is the same information as Storage Address 06009.

ID 07003 is the same as ID 06001.

Name 07004 is the same as Name 06002.

The information that is required to access the objects/files/data such as Storage Address 06009, ID 07003 and Name 07004 is described in this table.

Num 07002 is the summation of the corresponding objects/files/data which are stored in the NAS System 01000.

Figure 8:
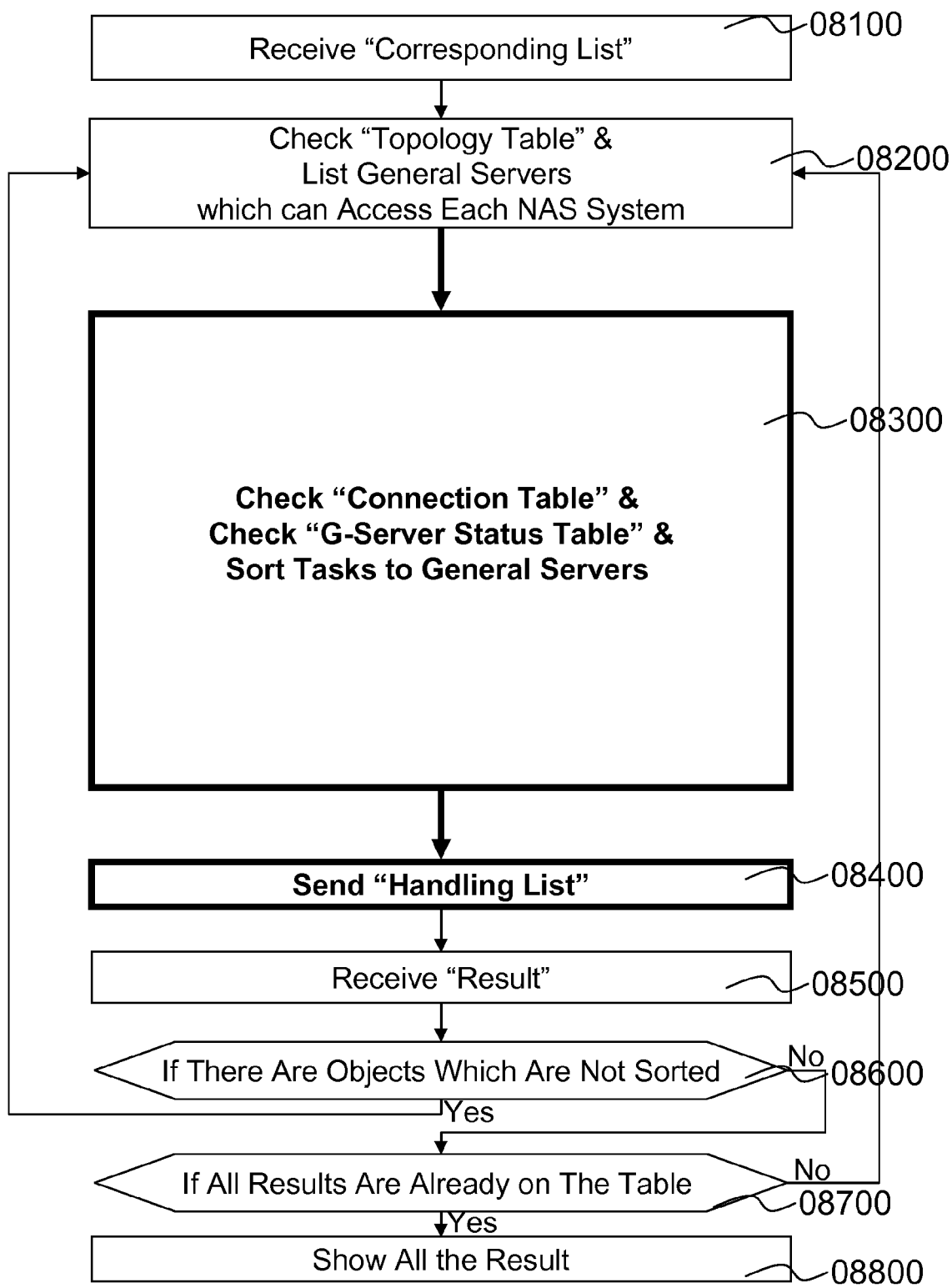
FIG. 8 illustrates the details of an exemplary embodiment of the Step2 04200, Step3 04300, and Step4 04400 of the process shown in FIG. 4.

FIG. 8 illustrates the details of Step2 04200, Step3 04300, and Step4 04400 of the process shown in FIG. 4. Sort Server 03100 receives Corresponding List 07001 and eventually gets results.

At Step 08100, Sort Server 03100 receives Corresponding List 07001.

At Step 08200, Sort Server 03100 checks Topology Table 03103, and lists General Servers 03200 which can access to NAS System 01000. The details of the Topology Table 03103 are described with reference to FIG. 13.

At step 08300, Sort Server 03100 checks Connection Table 03104, and ranks General Servers 03200. Sort Server 03100 also checks General Server Status Table 03105, and sorts tasks according to the status. Some examples of this sort algorithm are described in FIGS. 9-12.

At step 08400, Sort Server 03100 reads out Handling List. About Handling List, the details are described in FIG. 16. In Handling List, there is an assignment to General Servers 03200. General Servers 03200 downloads objects/files/data from indicated NAS System 01000, and calculate the result.

At step 08500, Sort Server 03100 collects result from each General Server 03200.

At step 08600, Sort Server 03100 checks whether all the objects/files/data which is required to accomplish the task are sorted or not. If some objects/files/data are not sorted, it goes back to Step 08200. If all the objects/files/data are sorted, it goes to Step 08700.

At step 08700, Sort Server 03100 checks whether all the results are collected. If some General Servers 03200 didn't reply its result, Sort Server 03100 sorts the similar task to other General Servers 03200. It goes back to Step 08200. If all the results are collected, it goes to Step 08800.

At Step 08800, Sort Server 03100 shows collected results.

Figure 9:
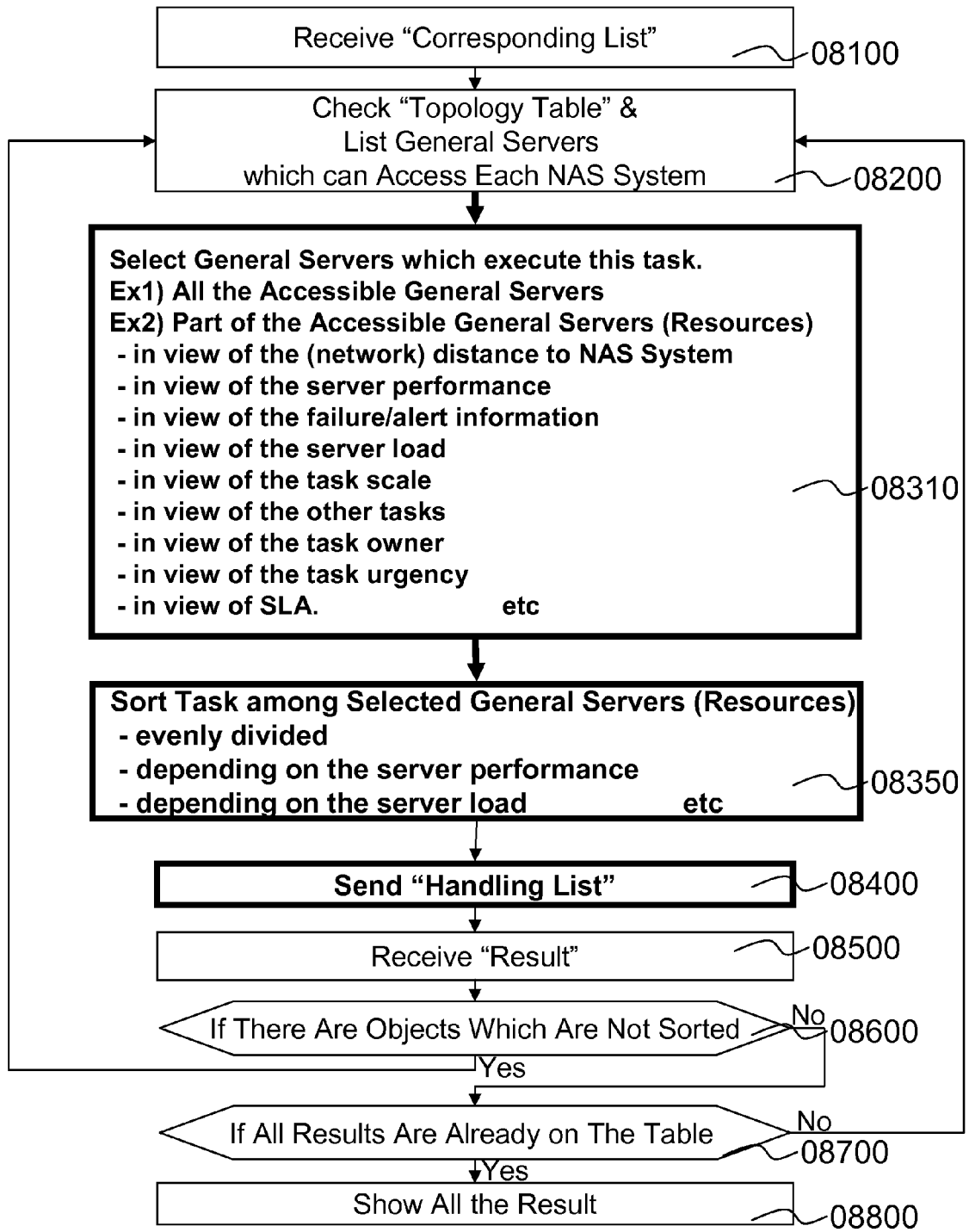
FIG. 9 illustrates certain examples of the step 08300 in the process illustrated in FIG. 8.

FIG. 9 illustrates certain examples of the step 08300 in the process illustrated in FIG. 8.

Step 08100 and Step 08200 are the same as in FIG. 8.

Step 08310 and Step 08350 correspond to Step 08300 in FIG. 8.

At Step 08310, Sort Server 03100 selects General Servers 03200 which execute the task. For example, Sort Server 03100 sorts the task to all the General Servers 03200 which can access to NAS System 01000. For another example, Sort Server 03100 sorts the task to partial General Servers 03200. To select partial General Servers 03200, Sort Server 03100 applies following criteria.

Sort Server 03100 can select General Servers 03200 in view of the network distance between General Servers 03200 and NAS System 01000 which stores required objects/files/data. The General Server 03200 which is located near NAS System 01000 is high on the list. For one example, Sort Server 03100 sorts tasks to General Servers 03200 which are located within 10 ms distance from NAS System 01000. If the task is not urgency, the time threshold will be longer such as 100 ms.

Sort Server 03100 can select General Servers 03200 in view of the server performance. The high performance server is high on the list. Sort Server 03100 can sort much tasks to high performance General Server 03200. For example, Sort Server 03100 sorts tasks in accordance with the CPU clock frequency. For another example, Sort Server 03100 sorts tasks in accordance with the memory size.

Sort Server 03100 can select General Servers 03200 in view of the failure information. The General Servers 03200 which cause a system failure are put off from the list. If General Server 03200 has some troubles, Sort Server 03100 doesn't sort tasks to the General Server 03200. If Sort Server 03100 has already sorted tasks to the General Server 03200, and has not got results, Sort Server 03100 re-sorts tasks to other General Servers 03200. For another example, if it takes more than 10 minutes, Sort Server 03100 thinks it trouble, and Sort Server 03100 can re-sort tasks. In case the task is important, the threshold time can become shorter. "0 minutes" means that Sort Server 03100 sorts the same task to two or more General Servers 03200.

Sort Server 03100 can select General Servers 03200 in view of the server load. The General Servers 03200 whose CPU load is low is high on the list. For example, Sort Server 03100 can sort tasks to General Servers 03200, till General Server 03200 CPU load becomes 50%. Sort Server 03100 can input more tasks at one time when General Server 03200 CPU load is lower than 10%, and the higher the CPU load becomes, the less Sort Server 03100 input task becomes.

Sort Server 03100 can select General Servers 03200 in view of the task scale. Sort Server 03100 decides quantity of General Servers 03200 according to the task scale. For example, Sort Server 03100 can select 1 General Server 03200 per 10,000 objects. If the task becomes important, the threshold becomes lower.

Sort Server 03100 can select General Servers 03200 in view of the other task. Sort Server 03100 sorts a lot of General Servers 03200 when other task is not much loaded. For example, when 100 users input tasks simultaneously, Sort Server 03100 sorts 5 General Server 03200 to each user task.

Sort Server 03100 can select General Servers 03200 in view of the task owner. Sort Server 03100 sorts a lot of General Servers 03200 when high rank user input the task. For example high rank user's task can use 10 General Servers 03200. Or high rank user's task use double General Servers 03200 than normal user's task.

Sort Server 03100 can select General Servers 03200 in view of the urgency of the task. Sort Server 03100 can select General Servers 03200 in view of the Service Level Agreement (SLA). Sort Server 03100 sorts General Servers 03200 to meet the urgency/SLA. Sort Server 03100 can sort many General Servers for urgent tasks. Or Sort Server 03100 can order to suspend non-urgent tasks, and to do urgent tasks.

Sort Server 03100 can modify/add algorithms, and according to the algorithms, Sort Server 03100 can read out Handling List.

These are examples, and Sort Server 03100 can apply several criteria.

At Step 08350, Sort Server 03100 sorts task among selected General Servers 03200.

For example, Sort Server 03100 sorts task evenly to selected General Servers 03200.

For another example, Sort Server 03100 sorts task depending on the server performance or the server load, and avoid slanting.

Step 08400-08800 are the same as in FIG. 8.

Figure 11:
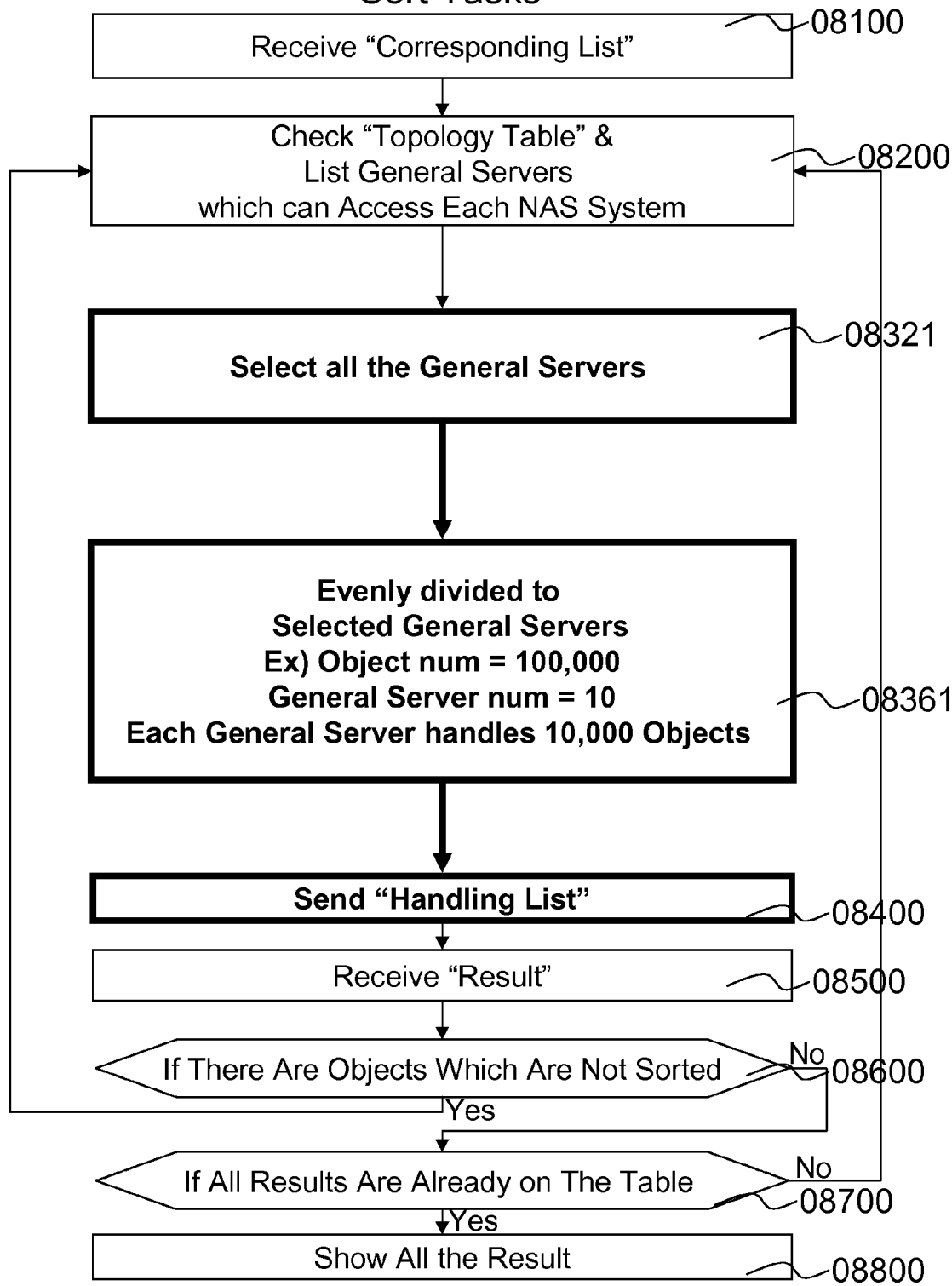
FIG. 11 illustrates an exemplary embodiment of step 08300 of a process of FIG. 8.

FIG. 11 illustrates an exemplary embodiment of step 08300 of a process of FIG. 8.

Step 08100 and Step 08200 are the same in FIG. 8.

Step 08311, Step 08312, Step 08313 and Step 08351 correspond to Step 08300 in FIG. 8.

At Step 08311, Sort Server 03100 checks Connection Table 03104, and ranks General Servers 03200 which can access to NAS System 01000. For example, Sort Server 03100 lists General Servers 03200 from which Round Trip Time to NAS System 01000 is less than 1 ms.

At Step 08312, Sort Server 03100 checks General Server Status Table 03105, and lists up General Servers 03200 whose CPU load is not high. In this figure, Sort Server 03100 lists up General Servers 03200 whose CPU load is less than 20%.

At Step 08313, Sort Server 03100 checks task scale, and decides how many General Servers 03200 are required. For example, Sort Server 03100 selects one General Server 03200 per 10,000 objects/files/data to calculate.

At Step 08351, Sort Server 03100 evenly divides tasks to selected General Servers 03200.

Step 08400-08800 are the same as FIG. 8.

Thus, Sort Server 03100 sorts tasks to General Servers 03200.

FIG. 11 illustrates an exemplary embodiment of step 08300 of a process of FIG. 8.

Step 08100 and Step 08200 are the same as in FIG. 8.

Step 08321 and Step 08361 correspond to Step 08300 in FIG. 8.

At Step 08321, Sorts Server 03100 selects all the General Servers 03200. In this figure, all the General Servers 03200 share, and accomplish the task.

At Step 08361, Sorts Server 03100 sorts tasks to General Servers 03200. If there are 10 General Servers 03200 and 100,000 objects/files/data to calculate, Sorts Server 03100 sorts 10,000 objects/files/data to each General Server 03200.

Step 08400-08800 are the same as in FIG. 8.

Thus, Sort Server 03100 sorts tasks to General Servers 03200.

Figure 12:
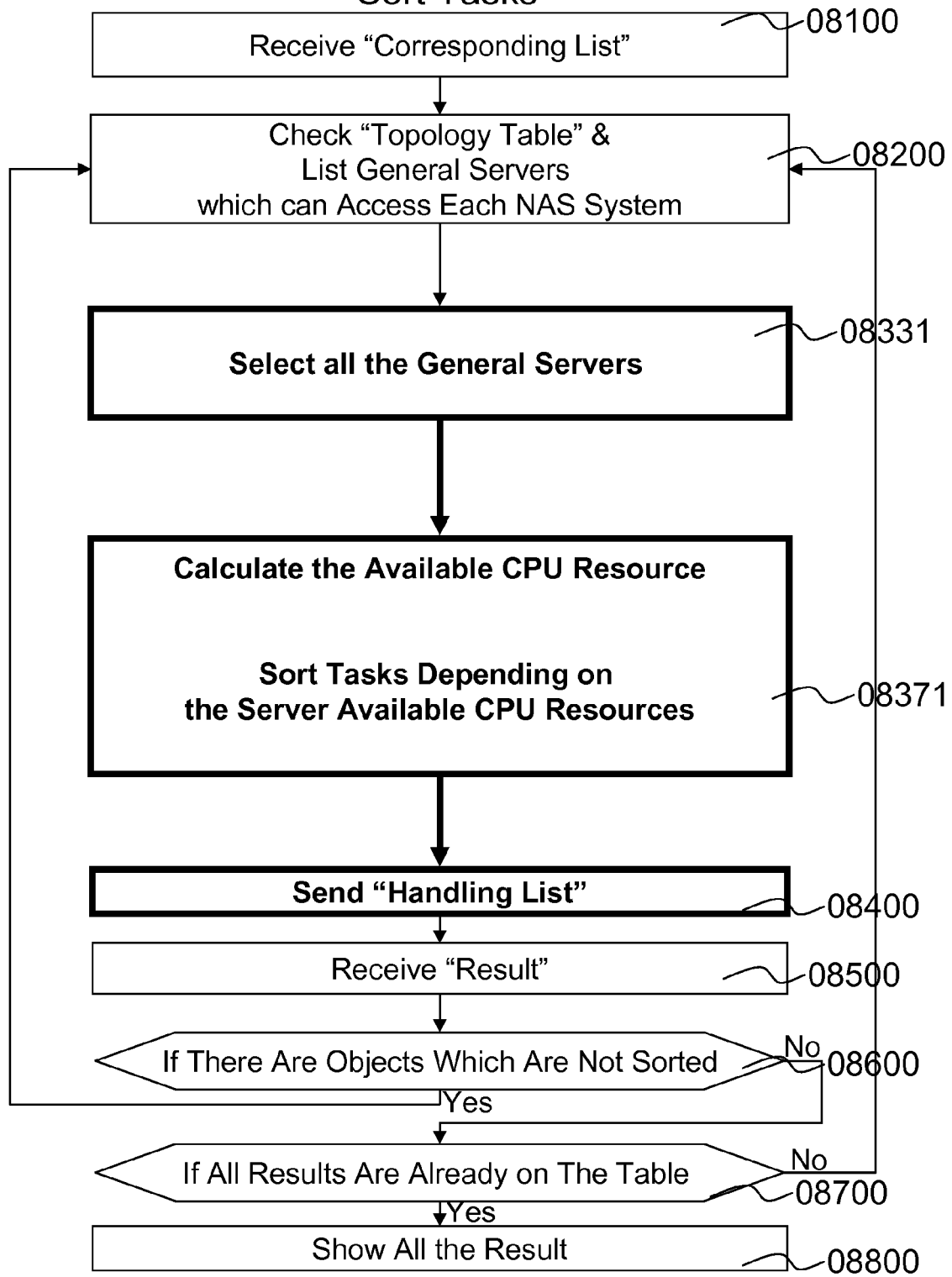
FIG. 12 illustrates an exemplary embodiment of step 08300 in the process illustrated in FIG. 8.

FIG. 12 illustrates an exemplary embodiment of step 08300 in the process illustrated in FIG. 8.

Step 08100 and Step 08200 are the same as in FIG. 8.

Step 08331 and Step 08371 correspond to Step 08300 in FIG. 8.

At Step 08331, Sorts Server 03100 selects all the General Servers 03200. In this figure, all the General Servers 03200 share, and accomplish the task.

At Step 08371, Sorts Server 03100 calculates the available CPU resource of General Servers 03200, and sorts tasks to General Servers 03200 according to the available CPU resource.

Step 08400-08800 are the same as in FIG. 8.

Thus, Sort Server 03100 sorts tasks to General Servers 03200.

FIG. 13 illustrates an exemplary embodiment of a Topology Table 03103.

This table describes about the connection between NAS System 01000 and General Server 03200. Each General Server 03200 checks the connectivity.

The column 13101-1/13101-2/13101-3/13101-4/13101-5 shows the information of General Servers 03200 which access to NAS System 01000, calculate, and accomplish tasks.

The line 13001-1/13001-2/13001-3 shows the information of NAS System which stores the objects/files/data.

If General Server 13101-1 can access to NAS System 13001-1, "OK" is recorded in the field. If not, "No Connection" is recorded.

In the Corresponding List 07001, Storage Address 07001 is described. Sort Server checks this Topology Table 03103, and lists General Servers 03200 that can access to each NAS System 01000.

FIG. 14 illustrates Connection Table 03104 of the Sort Server 03100.

This table describes the detailed connectivity between NAS System 01000 and General Servers 03200.

For example, General Server 03200 is connected to NAS System 01000, but they are geographically dispersed. In this case, it may take much time for General Server 03200 to download objects/files/data from NAS System 01000. So it is not better to sort tasks to the General Server 03200 to download objects/files/data from the NAS System 01000.

The column 14101-1/14101-2/14101-3 shows the information of General Servers 03200.

The line 14001-1/14001-2/14001-3 shows the information of NAS System 01000.

The crossover field means the distance between General Server 03200 and NAS System 01000.

The General Server 03200 can be installed agents that measure the distance to NAS System 01000, and can send the information to Sort Server 03100.

Other server located near the General Server 03200 can measure the distance to NAS System 01000.

In this figure, the round trip time between General Server-2 and NAS System-1 is 10 ms, and it takes much time than other connection. In such a case, Sort Server 03100 sorts tasks that need downloading objects from NAS System-1 to other General Servers 03200 except General Server-2.

FIG. 15 illustrates General Server Status Table 03105 of the Sort Server 03100. This table describes the status of General Server 03200. The status comprises several components such as Name 15001, Address 15002, Site 15003, and CPU 15004.

General Server is uniquely determined by its Name 15001 and Address 15002.

Most tasks may be calculated by General Server 03200 which is located in the same site as NAS System 01000. In this case, Site information 15003 is used.

CPU information 15004 is CPU load of General Server 03200. Sort Server can sort tasks according to the CPU load 15004. In this case, General Server-1 whose CPU load is 1% will be sorted more task than General Server-3 whose CPU load is 50%. This CPU information 15004 can be measured by agents installed in General Server 03200, and can be sent to Sort Server 03100.

FIG. 16 illustrates Handling List, which the Sort Server 03100 reads out. This Handling List is sent to General Servers 03200, and each General Server 03200 downloads objects/files/data from described NAS System and calculates tasks. Task ID information 16001 and General Server information 16002 is added to Corresponding List 07001.

Sort Server 16001 manages tasks with Task ID 16001. General Server 03200 replies results with Task ID 16001. Sort Server 03100 can remake Handling List and send to other General Servers 03200 to do some task, if the task is not accomplished for a long time.

General Server information 16002 indicates General Server 03100 to do the task.

This Handling List is made through the process 08300 in FIG. 8.

Figure 17:
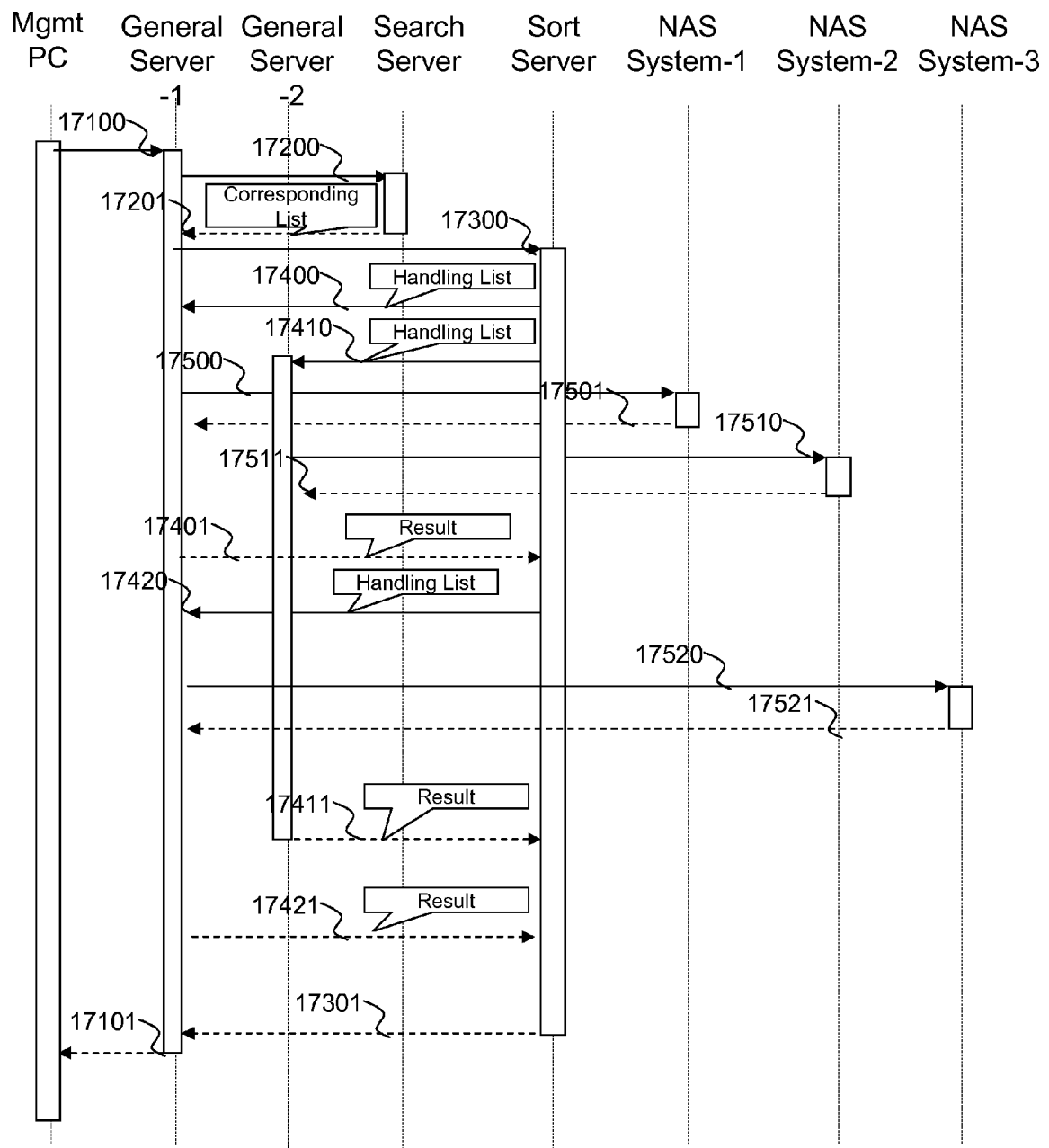
FIG. 17 illustrates an exemplary embodiment of a flow chart of the invention.

FIG. 17 illustrates an exemplary embodiment of a flow chart of the invention. This flow chart is similar to the one shown in FIG. 4. With reference to FIG. 17, one example of the information exchange is described below.

At Flow 17100, Management PC 03300 inputs tasks to General Server-1 03200-1. This task can be "Analyze External Reports about Product XYZ, and Develop Commercial Research" or "Analyze Customer Opinions about Product ABC, and Summarize" or other order.

At Flow 17200, General Server-1 03200-1 sends the task information to Search Server 03000. Search Server 03000 searches objects/files/data to accomplish the task, and sends back Corresponding List 07001 to General Server-1 03200-1 at Flow 17201.

At Flow 17300, General Server-1 03200-1 sends Corresponding List 07001 to Sort Server 03100. Sort Server 03100 sorts tasks. The sort algorithm is described in FIGS. 9-12.

At Flow 17400, Sort Server 03100 sends Handling List to General Server 03200 which downloads objects/files/data from NAS System, and accomplishes the task. In this figure, General Server-1 03200-1 accomplishes the task.

At Flow 17500 and Flow 17501, General Server-1 03200-1 interprets the Handling List, and downloads designated objects/files/data from NAS System-1 01000-1. General Server-1 03200-1 accomplishes the task with downloaded objects/files/data. And at Flow 17401, General Server-1 03200-1 sends back the result to Sort Server 03100.

Flow 17410, 17510, 17511, and 17411 are similar to Flow 17400, 17500, 17501, and 17401. At Flow 17410, Sort Server 03100 sends Handling List to General Servers-2 03200-2 which downloads objects/files/data from NAS System, and accomplishes the task.

At Flow 17510 and Flow 17511, General Server-2 03200-2 interprets the Handling List, and downloads designated objects/files/data from NAS System-2 01000-2. General Server-2 03200-2 accomplishes the task with downloaded objects/files/data. And at Flow 17411, General Server-2 03200-2 sends back the result to Sort Server 03100.

Flow 17420, 17520, 17521, and 17421 are similar to Flow 17400, 17500, 17501, and 17401. If there are tasks which are not accomplished, Sort Server 03100 can send Handling List to the General Server 03200 as the response to results message at 17401.

After Sort Server 03100 collects all the results of divided tasks, Sort Server 03100 sends back the summarize results to General Server-1 03200-1 at Flow 17301.

At Flow 17101, General Server-1 03200-1 sends back results to Management PC 03300.

FIG. 18 illustrates Task Management Table 03106 of the Sort Server 03100. With this table, Sort Server 03100 manages tasks. This table has Start Time information 18001, Finish Time information 18002, and Result information 18003 added to the information of Handling List.

Start Time information 18001 is the time when Sort Server 03100 sends Handling List to General Server 03200 that is described in General Server information 16002.

Finish Time information 18002 is the time when General Server 03200 that is described in General Server information 16002 sends back the results to Sort Server 03100.

Result information 18003 has the information at which results are stored.

Sort Server 03100 can send the same task to the different General Servers 03200. If one General Server 03200 fails, the other General Server 03200 can reply the result. Additionally, Sort Server 03100 can collect results faster, and Sort Server 03100 can confirm the result.

b. Second Embodiment

Figure 19:
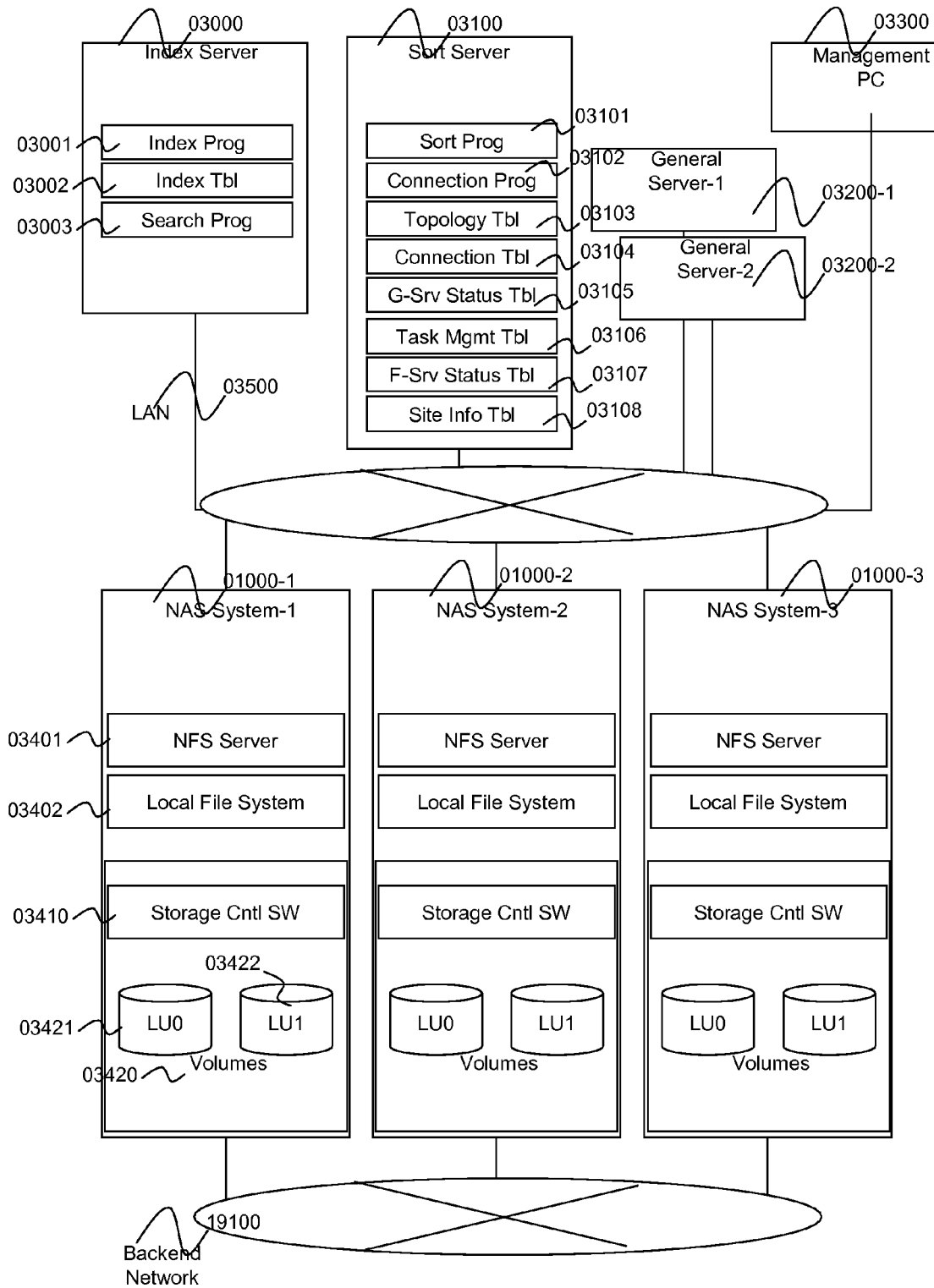
FIG. 19 and FIG. 20 illustrate another exemplary embodiment of the invention.
Figure 20:
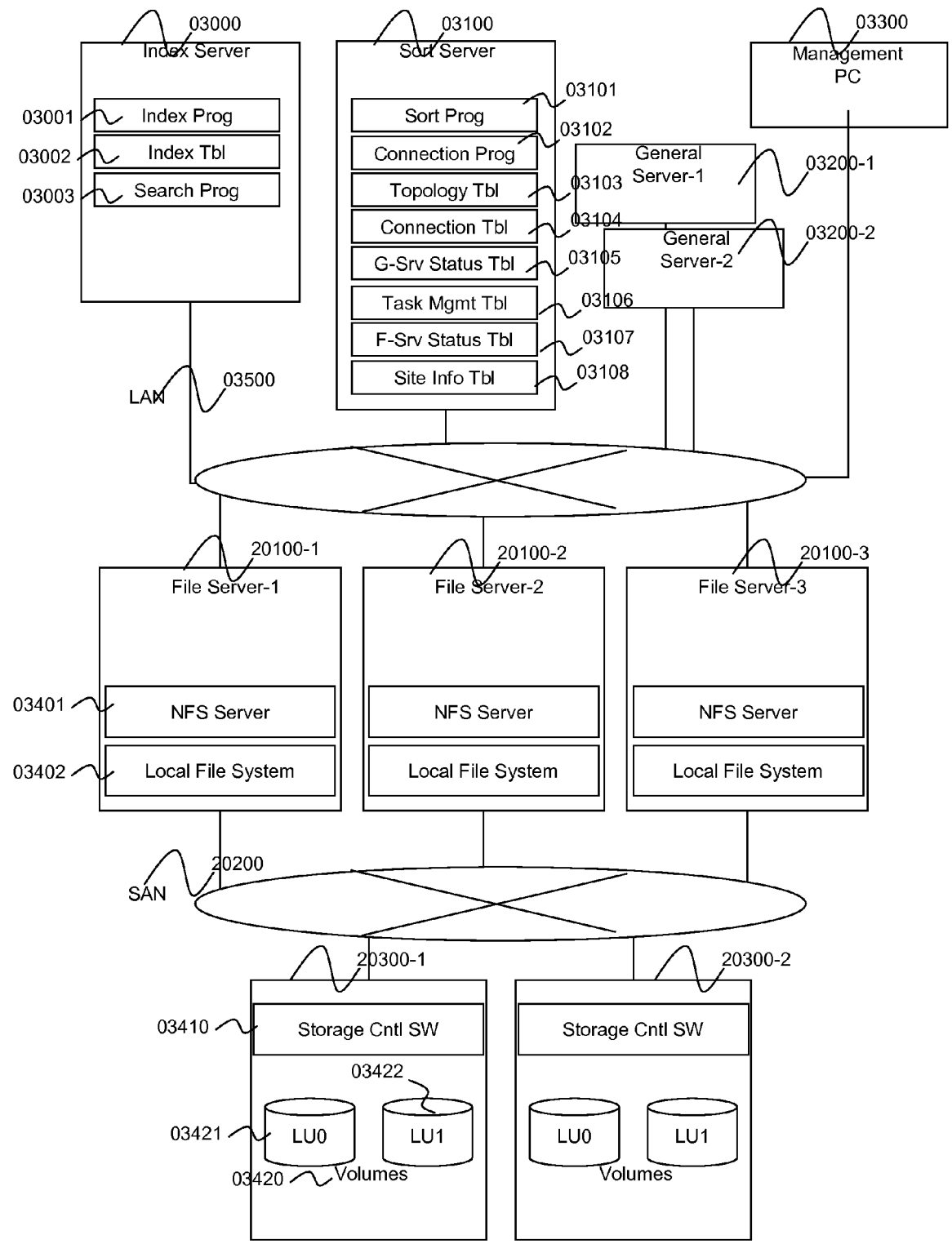

FIG. 19 and FIG. 20 illustrate another exemplary embodiment of the invention.

In FIG. 19, Storage Volumes 03420 are accessed by several NAS Systems 01000.

In FIG. 20, Storage Volumes 03420 are accessed by several File Servers 20100.

The difference between FIG. 3 and FIG. 19 is the existence of Backend Network 19100. Due to the Backend Network 19100, NAS System-1 01000-1 can access to the Volumes of NAS System-2 01000-2/NAS System-3 01000-3.

In FIG. 20, objects/files/data are stored in SAN environment. File Server-1 20100-1/File Server-2 20100-2/File Server-3 20100-3 can access to Storage System 20300-1/20300-2 via SAN 20200.

In these cases, several NAS Systems 01000/File Servers 20200 can access to the same objects/files/data, so Sort Server 03100 needs to sort tasks according to the NAS System/File Server status. Later, the details are described in FIGS. 21-24.

Figure 10:
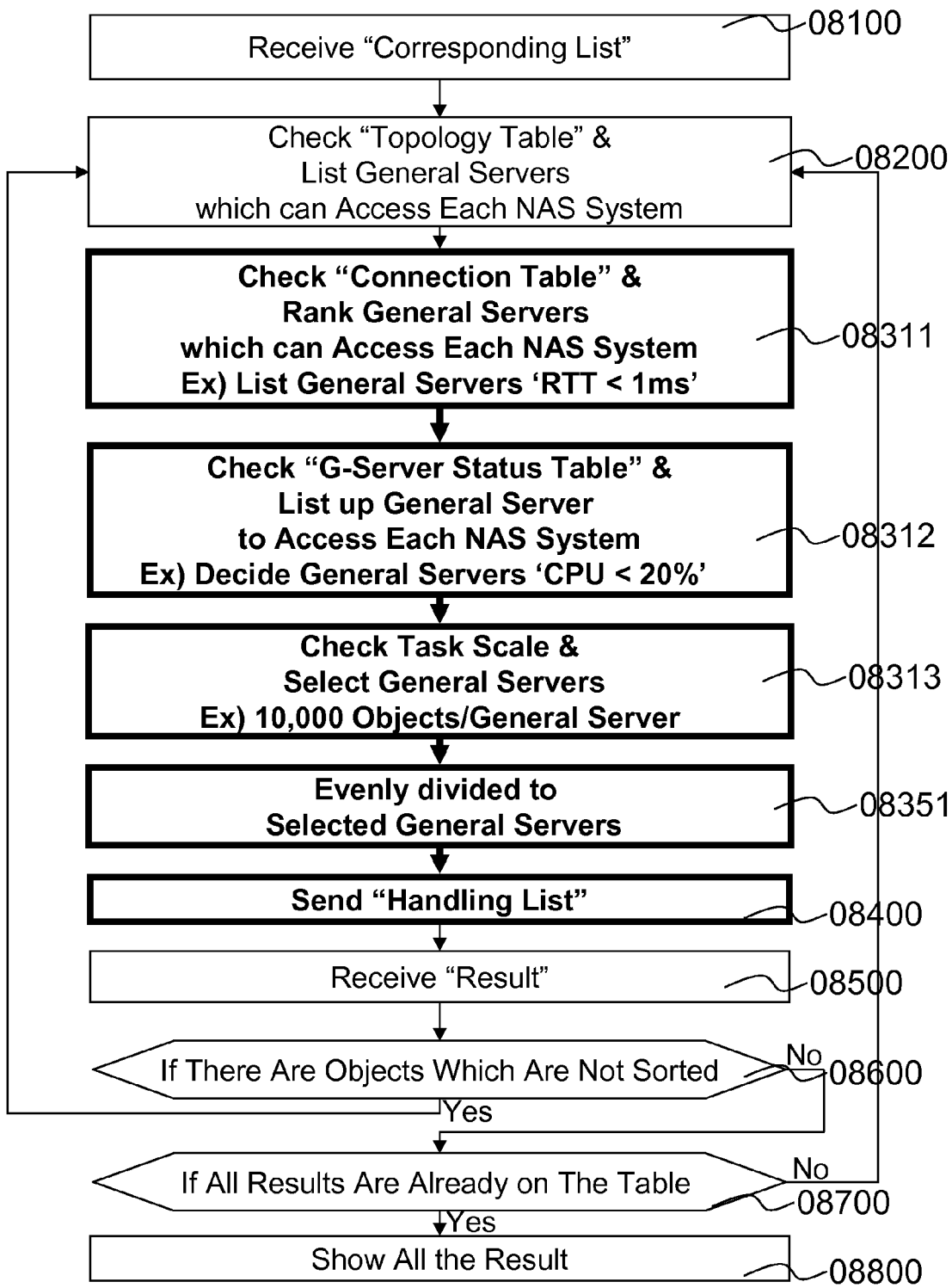
FIG. 10 illustrates an example of step 08300 in the process illustrated in FIG. 8.
Figure 21:
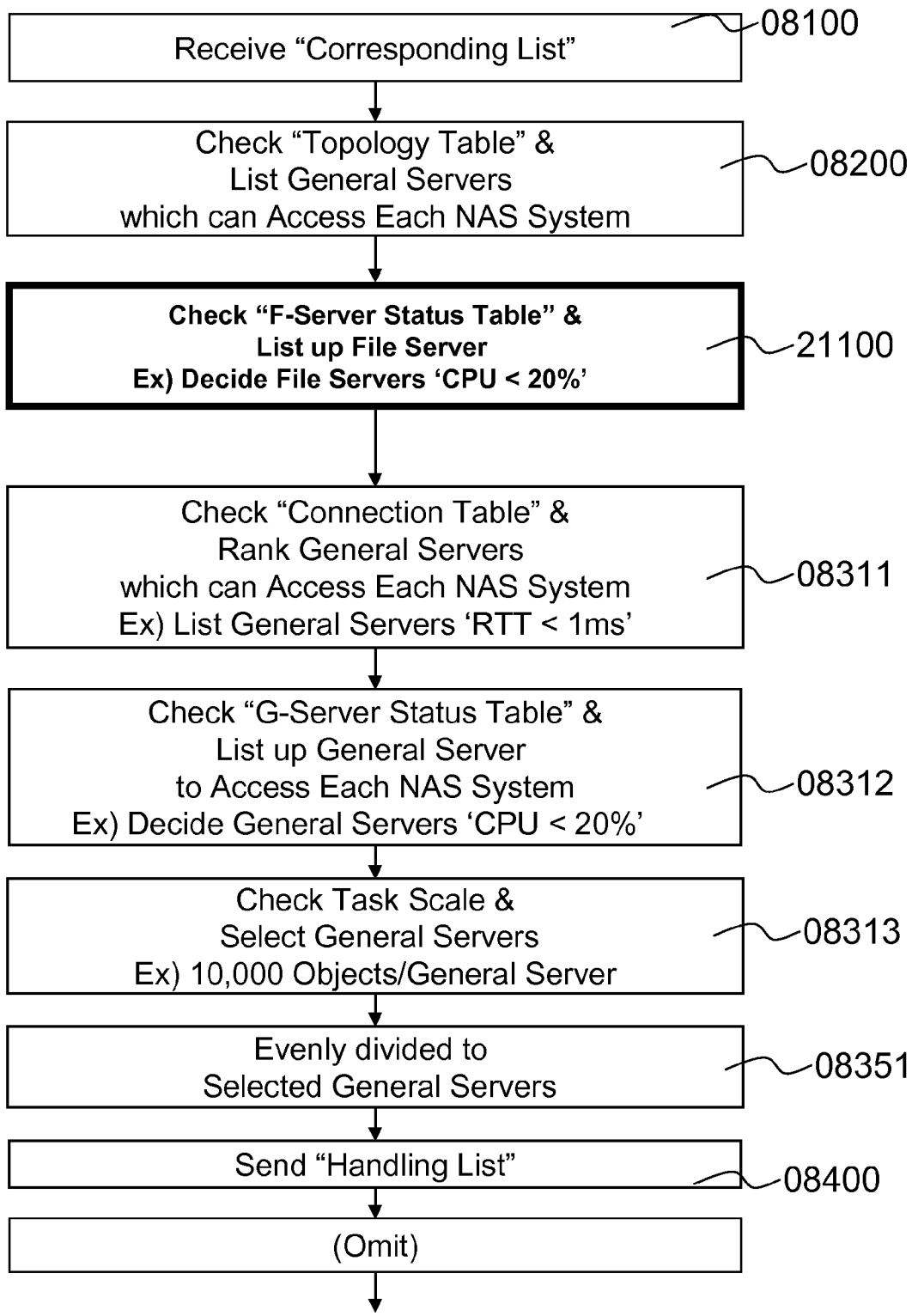
FIG. 21 illustrates an exemplary embodiment of the invention using the configuration shown in FIG. 10.

FIG. 21 illustrates an exemplary embodiment of the invention using the configuration shown in FIG. 10.

Step 08100 and Step 08200 are the same as in FIG. 10. In case illustrated in FIG. 20, objects/files/data are stored in Storage System, so the phrase "NAS System" needs to be translated into "Storage System". At Step 08100, Corresponding List 07001 is used similarly. The component is the same. But, the same ID objects/files/data information appears several times. In FIG. 22, this information is described in detail.

Step 21100 is added. Several File Servers 20200 can access to the same objects/files/data, so Sort Server 03100 needs to select File Server 20200 with File Server Status Table 03107. About File Server Status Table 03107, it is described with FIG. 23.

After Step 21100, it is similar to FIG. 10.

FIG. 22 illustrates an exemplary embodiment of Corresponding List 07001 in the configuration illustrated in FIG. 20.

The components in this figure are the same as the components in the configuration of FIG. 7. In the configuration shown in FIG. 22, the same ID objects/files/data appear several times, because File Server-1 20100-1, File Server-2 20100-2 and File Server-3 20100-3 can access to the same ID objects/files/data. In this case, Sort Server 03100 needs to consider overlap in Corresponding List 07001.

FIG. 23 shows the details of File Server Status Table 03107 of Sort Server 03100.

Name 23001, Address 23002 and Site 23003 identifies File Server 20100 uniquely. In this case, CPU information 23004 shows the status of File Server 20300. File Server 20300 can be installed agents to measure its CPU load, and can send the CPU information to Sort Server 03100. Sort Server can make judgments with threshold amount. In this case, all the objects/files/data are accessed by File Server-1 20100-1, File Server-2 20100-2 and File Server-3 20100-3 equally, so Sort Server 03100 sorts tasks to File Server-1 20100-1 and File Server-2 20100-2 whose CPU load are much lower than the CPU load of File Server-3 20100-3.

FIG. 24 illustrates Handling List in the configuration illustrates in FIG. 20. The components are the same as the ones as in configuration shown in FIG. 16. In this case, all the objects/files/data are downloaded only once.

c. Third Embodiment

Figure 25:
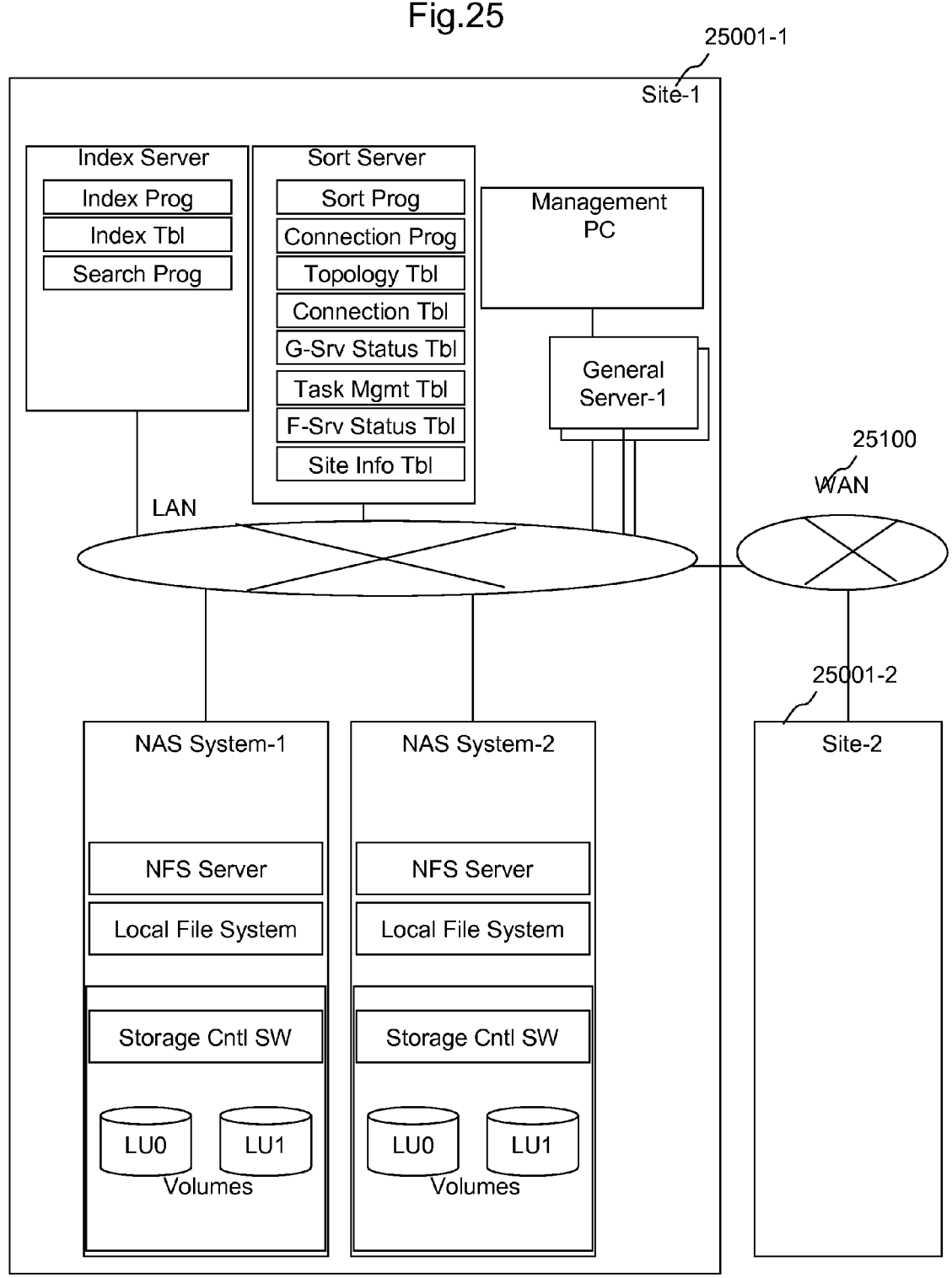
FIG. 25 illustrates another exemplary embodiment of the invention.

FIG. 25 shows another example of this invention. This system comprises several sites. Each site has the similar apparatus that is shown in FIG. 3, FIG. 19, FIG. 20. These sites are connected via network such as WAN (Wide Area Network) 25100.

Figure 26:
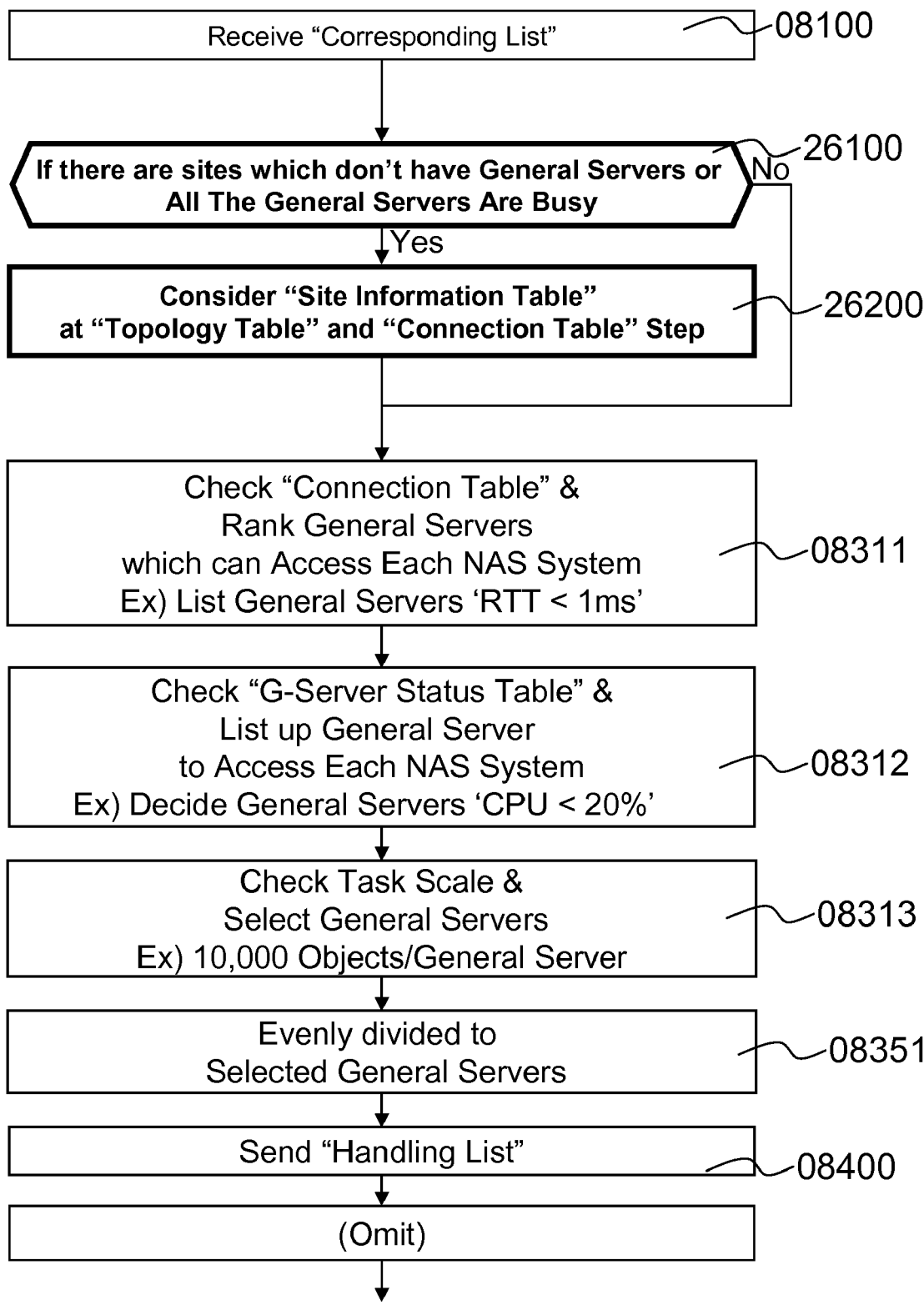
FIG. 26 illustrates an exemplary embodiment of a flow chart of the invention.

FIG. 26 illustrates an exemplary embodiment of a flow chart of the invention. The differences between FIG. 26 and FIG. 10 are Step 26100 and Step 26200. It may take much time to download objects/files/data that are stored in NAS System located in the different site from the site of General Servers 03200.

At Step 26100, Sort Server 03100 sorts tasks to General Servers 03200 that are located in the same site as NAS System 01000. If no General Servers 03200 exists, or all General Servers 03200 are overloaded, Sort Server 03100 can sort tasks to General Servers 03200 that are located in different site from the site NAS Systems 01000 are located. In that case, Site Information Table 03108 is taken into consideration at Step 08311 and Step 08312. For example, in case that the Round Trip Time between Site-1 25001-1 and Site-2 25001-2 is 30 ms, Sort Server 03100 considers the distance at Step 08311.

Sort Server 03100 can wait sorting tasks, until another General Server 03200, which locates in the same site as the site in which NAS System 01000 locates, finishes its task, and its CPU load gets lower.

FIG. 27 illustrates the details of the Site Information Table 03108.

The column 27101-1, 27101-2, 27101-3 and 27101-4 shows the site information. The line 27000-1, 27000-2, 27000-3, 27000-4 shows the site information also. The distances between sites are recorded in the crossover field. The distance can be measured by the delegate servers that exist in each site. The measured information can be sent to Sort Server 03100 periodically.

d. Exemplary Computer Platform

Figure 28:
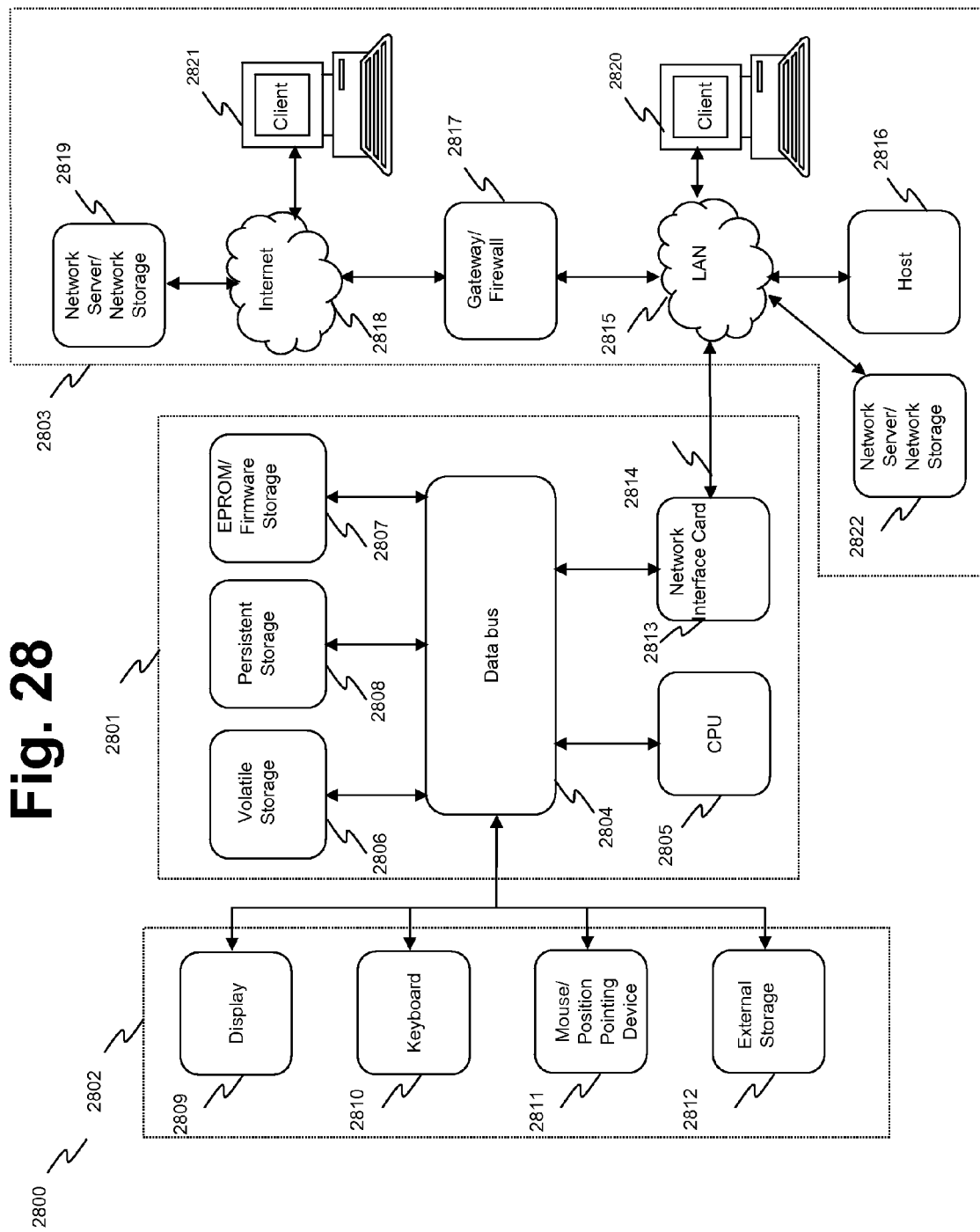
FIG. 28 illustrates an exemplary embodiment of a computer platform upon which the inventive system may be implemented.

FIG. 28 is a block diagram that illustrates an embodiment of a computer/server system 2800 upon which an embodiment of the inventive methodology may be implemented. The system 2800 includes a computer/server platform 2801, peripheral devices 2802 and network resources 2803.

The computer platform 2801 may include a data bus 2804 or other communication mechanism for communicating information across and among various parts of the computer platform 2801, and a processor 2805 coupled with bus 2801 for processing information and performing other computational and control tasks. Computer platform 2801 also includes a volatile storage 2806, such as a random access memory (RAM) or other dynamic storage device, coupled to bus 2804 for storing various information as well as instructions to be executed by processor 2805. The volatile storage 2806 also may be used for storing temporary variables or other intermediate information during execution of instructions by processor 2805. Computer platform 2801 may further include a read only memory (ROM or EPROM) 2807 or other static storage device coupled to bus 2804 for storing static information and instructions for processor 2805, such as basic input-output system (BIOS), as well as various system configuration parameters. A persistent storage device 2808, such as a magnetic disk, optical disk, or solid-state flash memory device is provided and coupled to bus 2801 for storing information and instructions.

Computer platform 2801 may be coupled via bus 2804 to a display 2809, such as a cathode ray tube (CRT), plasma display, or a liquid crystal display (LCD), for displaying information to a system administrator or user of the computer platform 2801. An input device 2810, including alphanumeric and other keys, is coupled to bus 2801 for communicating information and command selections to processor 2805. Another type of user input device is cursor control device 2811, such as a mouse, a trackball, or cursor direction keys for communicating direction information and command selections to processor 2804 and for controlling cursor movement on display 2809. This input device typically has two degrees of freedom in two axes, a first axis (e.g., x) and a second axis (e.g., y), that allows the device to specify positions in a plane.

An external storage device 2812 may be coupled to the computer platform 2801 via bus 2804 to provide an extra or removable storage capacity for the computer platform 2801. In an embodiment of the computer system 2800, the external removable storage device 2812 may be used to facilitate exchange of data with other computer systems.

The invention is related to the use of computer system 2800 for implementing the techniques described herein. In an embodiment, the inventive system may reside on a machine such as computer platform 2801. According to one embodiment of the invention, the techniques described herein are performed by computer system 2800 in response to processor 2805 executing one or more sequences of one or more instructions contained in the volatile memory 2806. Such instructions may be read into volatile memory 2806 from another computer-readable medium, such as persistent storage device 2808. Execution of the sequences of instructions contained in the volatile memory 2806 causes processor 2805 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2805 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2808. Volatile media includes dynamic memory, such as volatile storage 2806.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 2805 for execution. For example, the instructions may initially be carried on a magnetic disk from a remote computer. Alternatively, a remote computer can load the instructions into its dynamic memory and send the instructions over a telephone line using a modem. A modem local to computer system 2800 can receive the data on the telephone line and use an infra-red transmitter to convert the data to an infra-red signal. An infra-red detector can receive the data carried in the infra-red signal and appropriate circuitry can place the data on the data bus 2804. The bus 2804 carries the data to the volatile storage 2806, from which processor 2805 retrieves and executes the instructions. The instructions received by the volatile memory 2806 may optionally be stored on persistent storage device 2808 either before or after execution by processor 2805. The instructions may also be downloaded into the computer platform 2801 via Internet using a variety of network data communication protocols well known in the art.

The computer platform 2801 also includes a communication interface, such as network interface card 2813 coupled to the data bus 2804. Communication interface 2813 provides a two-way data communication coupling to a network link 2814 that is coupled to a local network 2815. For example, communication interface 2813 may be an integrated services digital network (ISDN) card or a modem to provide a data communication connection to a corresponding type of telephone line. As another example, communication interface 2813 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 2813 sends and receives electrical, electromagnetic or optical signals that carry digital data streams representing various types of information.

Network link 2813 typically provides data communication through one or more networks to other network resources. For example, network link 2814 may provide a connection through local network 2815 to a host computer 2816, or a network storage/server 2817. Additionally or alternatively, the network link 2813 may connect through gateway/firewall 2817 to the wide-area or global network 2818, such as an Internet. Thus, the computer platform 2801 can access network resources located anywhere on the Internet 2818, such as a remote network storage/server 2819. On the other hand, the computer platform 2801 may also be accessed by clients located anywhere on the local area network 2815 and/or the Internet 2818. The network clients 2820 and 2821 may themselves be implemented based on the computer platform similar to the platform 2801.

Local network 2815 and the Internet 2818 both use electrical, electromagnetic or optical signals that carry digital data streams. The signals through the various networks and the signals on network link 2814 and through communication interface 2813, which carry the digital data to and from computer platform 2801, are exemplary forms of carrier waves transporting the information.

Computer platform 2801 can send messages and receive data, including program code, through the variety of network(s) including Internet 2818 and LAN 2815, network link 2814 and communication interface 2813. In the Internet example, when the system 2801 acts as a network server, it might transmit a requested code or data for an application program running on client(s) 2820 and/or 2821 through Internet 2818, gateway/firewall 2817, local area network 2815 and communication interface 2813. Similarly, it may receive code from other network resources.

The received code may be executed by processor 2805 as it is received, and/or stored in persistent or volatile storage devices 2808 and 2806, respectively, or other non-volatile storage for later execution. In this manner, computer system 2801 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized systems for data mining and distributed processing. It is intended that the specification and examples be considered as exemplary only, with a true scope and spirit of the invention being indicated by the following claims.

What is claimed is:

1. A sort server comprising:
a central processing unit;
a memory; and
a network interface configured to interconnect the sort server with a search server, a plurality of storage systems and a plurality of processing servers using at least one network,
wherein the sort server is configured to receive a search result from the search server and to assign a plurality of tasks to the plurality of processing servers,
wherein the search server identifies in said search result which storage systems of said plurality of storage systems includes objects matching a search term,
wherein identical objects matching said search term are stored in several storage systems of said plurality of storage systems, and said sort server determines which storage system among said several storage systems is accessed and which processing server among said plurality of processing servers is assigned for each task of plurality of tasks,
wherein the assignment of the plurality of tasks is based on a condition comprising the search result.

2. The sort server of claim 1, wherein the plurality of tasks collectively form a single processing job.

3. The sort server of claim 1, wherein the search result comprises information on a plurality of required objects and wherein the sort server is configured to control access of the plurality of processing servers to the plurality of required objects required to perform the plurality of tasks assigned to the plurality of processing servers,
wherein each of said plurality of storage systems is coupled to said sort server via a NAS head and includes storage volumes.

4. The sort server of claim 1, wherein the sort server uses the search result retrieved from the storage system and read out by the search server according to a user task.

5. The sort server of claim 1, wherein the search result comprises a plurality of object information associated with a plurality of objects, and wherein the plurality of processing servers collectively process the object information to accomplish a single processing job, specified by a user and related to the plurality of objects.

6. The sort server of claim 5, wherein the sort server is configured to determine which of the plurality of processing servers accesses each of the plurality of objects.

7. The sort server of claim 1, wherein the sort server is configured to assign a plurality of tasks to the plurality of processing servers in accordance, at least, with the CPU load of at least some of the plurality of processing servers.

8. The sort server of claim 1, wherein the sort server is configured to assign a plurality of tasks to the plurality of processing servers in accordance, at least, with an architecture of the at least one network.

9. The sort server of claim 1, wherein the sort server is configured to assign a plurality of tasks to the plurality of processing servers in accordance, at least, with a network distance between each of the plurality of the processing servers and the at least one storage system, which stores an object required by the each of the plurality of the processing servers.

10. The sort server of claim 1, wherein the sort server is configured to assign a plurality of tasks to the plurality of processing servers in accordance, at least, with a performance of at least some of the plurality of processing servers.

11. The sort server of claim 1, wherein the sort server is configured to assign a plurality of tasks to the plurality of processing servers in accordance, at least, with a failure information associated with the at least some of the plurality of processing servers.

12. The sort server of claim 1, wherein the sort server is configured to assign a plurality of tasks to the plurality of processing servers in accordance, at least, with an urgency of at least one of the plurality of tasks.

13. The sort server of claim 1, wherein the sort server is configured to assign a plurality of tasks to the plurality of processing servers in accordance, at least, with a service level agreement associated with at least some of the plurality of processing servers.

14. The sort server of claim 1, wherein the sort server is configured to assign a plurality of tasks to the plurality of processing servers in accordance, at least, with other tasks performed by at least some of the plurality of processing servers and influence of the other tasks on a performance of at least some of the plurality of processing servers.

15. A method performed by a sort server comprising a central processing unit, a memory and a network interface configured to interconnect the sort server with a search server, a plurality of storage systems and a plurality of processing servers using at least one network, the method comprising:
a. receiving a search result from the search server; and
b. assigning a plurality of tasks to the plurality of processing servers, wherein the assignment of the plurality of tasks is based on a condition comprising the search result;
wherein the search server identifies in said search result which storage systems of said plurality of storage systems includes objects matching a search term,
wherein identical objects matching said search term are stored in several storage systems of said plurality of storage systems, and said sort server determines which storage system among said several storage systems is accessed and which processing server among said plurality of processing servers is assigned for each task of plurality of tasks.

16. The method of claim 15, wherein the plurality of tasks collectively form a single processing job.

17. The method of claim 15, wherein the search result comprises information on a plurality of required objects and wherein the method further comprises controlling access of the plurality of processing servers to the plurality of required objects required to perform the plurality of tasks assigned to the plurality of processing servers;
wherein each of said plurality of storage systems is coupled to said sort server via a NAS head and includes storage volumes.

18. A tangible computer readable medium embodying a set of computer-executable instructions implementing a method performed by a sort server comprising a central processing unit, a memory and a network interface configured to interconnect the sort server with a search server, a plurality of storage systems and a plurality of processing servers using at least one network, the method comprising:
a. receiving a search result from the search server; and b. assigning a plurality of tasks to the plurality of processing servers, wherein the assignment of the plurality of tasks is based on a condition comprising the search result;

wherein the search server identifies in said search result which storage systems of said plurality of storage systems includes objects matching a search term, wherein identical objects matching said search term are stored in several storage systems of said plurality of storage systems, and said sort server determines which storage system among said several storage systems is accessed and which processing server among said plurality of processing servers is assigned for each task of plurality of tasks.

19. The tangible computer readable medium of claim 18, wherein the plurality of tasks collectively form a single processing job.

20. The tangible computer readable medium of claim 18, wherein the search result comprises information on a plurality of required objects and wherein the method further comprises controlling access of the plurality of processing servers to the plurality of required objects required to perform the plurality of tasks assigned to the plurality of processing servers;

wherein each of said plurality of storage systems is coupled to said sort server via a NAS head and includes storage volumes.

* * * * *